United States Patent
Spartano

(10) Patent No.: US 8,491,151 B2
(45) Date of Patent: *Jul. 23, 2013

(54) LIGHTING DEVICE HAVING LIGHT INTENSITY CONTROL

(75) Inventor: David A. Spartano, Brunswick, OH (US)

(73) Assignee: EVEREADY Battery Company, Inc., St. Louis, MO (US)

( * ) Notice: Subject to any disclaimer, the term of this patent is extended or adjusted under 35 U.S.C. 154(b) by 249 days.

This patent is subject to a terminal disclaimer.

(21) Appl. No.: 12/640,257

(22) Filed: Dec. 17, 2009

(65) Prior Publication Data

US 2010/0090613 A1    Apr. 15, 2010

Related U.S. Application Data

(63) Continuation of application No. PCT/US2008/067703, filed on Jun. 20, 2008.

(60) Provisional application No. 60/945,197, filed on Jun. 20, 2007, provisional application No. 61/023,577, filed on Jan. 25, 2008.

(51) Int. Cl.
  *F21L 4/04*   (2006.01)
(52) U.S. Cl.
  USPC ........... 362/205; 362/157; 362/270; 315/291; 315/292
(58) Field of Classification Search
  USPC ................... 362/205, 157, 270; 315/291, 292
  See application file for complete search history.

(56) References Cited

U.S. PATENT DOCUMENTS

| 4,048,631 | A  | * | 9/1977  | Flores ........................... 340/321 |
| 6,095,661 | A  | * | 8/2000  | Lebens et al. .................. 362/184 |
| 6,190,022 | B1 | * | 2/2001  | Tocci et al. .................... 362/259 |
| 6,722,771 | B1 | * | 4/2004  | Stephens ....................... 362/184 |
| 6,789,917 | B2 | * | 9/2004  | Parsons et al. ................. 362/184 |
| 6,984,900 | B1 | * | 1/2006  | Bruwer ........................... 307/87 |
| 7,510,294 | B2 | * | 3/2009  | Steele et al. ................... 362/114 |
| 2003/0137834 | A1 |   | 7/2003  | Jigamain et al. |
| 2004/0052076 | A1 | * | 3/2004  | Mueller et al. ................. 362/293 |
| 2005/0040773 | A1 |   | 2/2005  | Lebens et al. |
| 2005/0122712 | A1 | * | 6/2005  | Kim .............................. 362/184 |
| 2007/0041174 | A1 | * | 2/2007  | Lo ................................. 362/102 |
| 2007/0268150 | A1 | * | 11/2007 | Fraser ....................... 340/815.63 |
| 2008/0180032 | A1 | * | 7/2008  | Kim et al. ...................... 315/151 |

OTHER PUBLICATIONS

Patent Cooperation Treaty (PCT), International Search Report and Written Opinion for Application No. PCT/US2008/067703, filed Jun. 20, 2008, mailed Sep. 26, 2008, European Patent Office, Netherlands.

* cited by examiner

*Primary Examiner* — Jacob Y Choi
*Assistant Examiner* — Anthony Arpin
(74) *Attorney, Agent, or Firm* — Eveready Battery Company, Inc.

(57) ABSTRACT

A lighting device is generally illustrated having a light body having forward facing light sources including a visible white light source, visible colored light source and an infrared light source. Additionally, a side facing light source is provided. The light body also includes switches for activating the visible light sources and a three-position switch for activating the IR light source and the side facing light source. At least one switch is provided for turning at least one of the light sources on and off and further adjusting light intensity of the light source. The light source of the lighting device may further be controlled based on a detected chemistry composition of the power source.

18 Claims, 19 Drawing Sheets

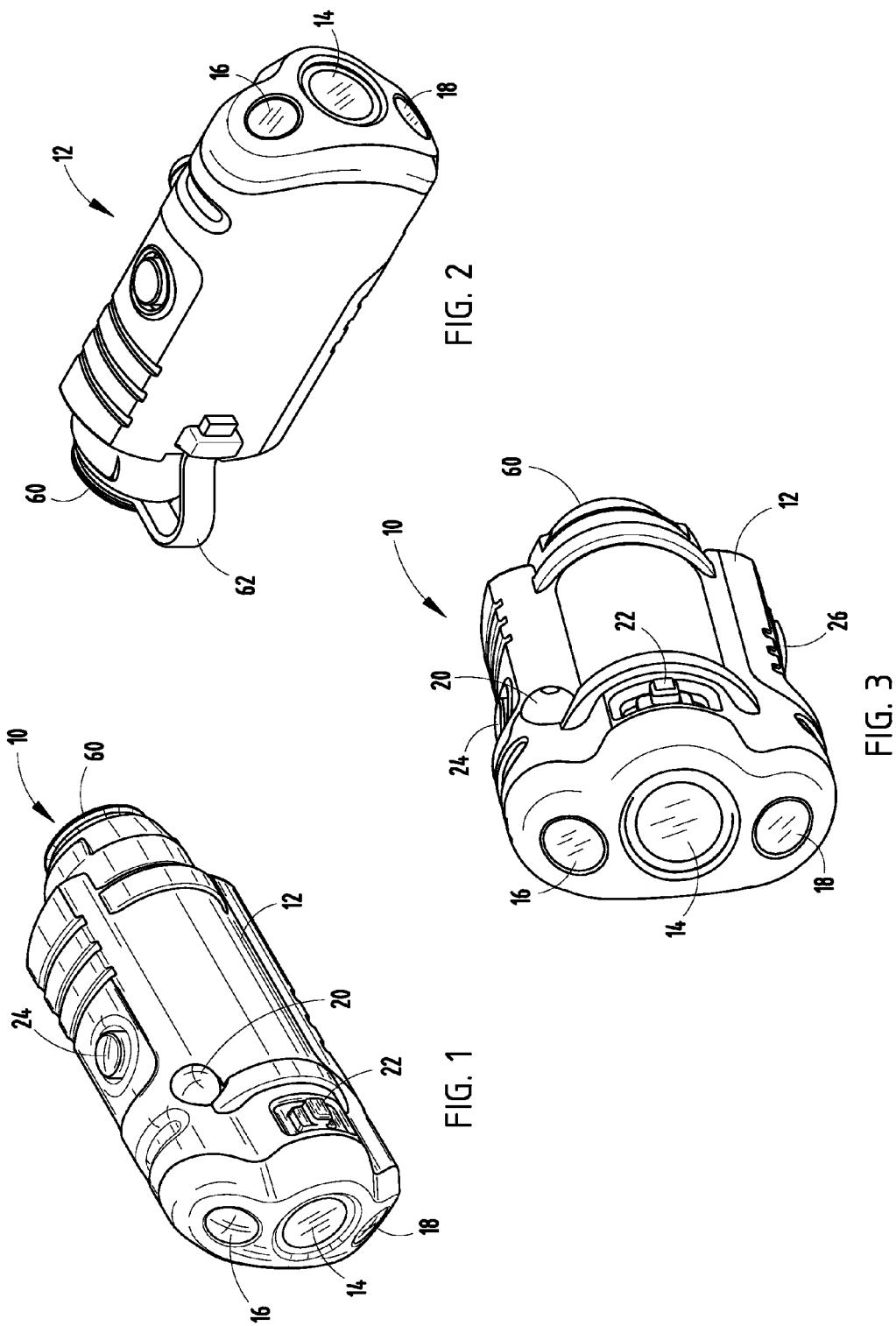

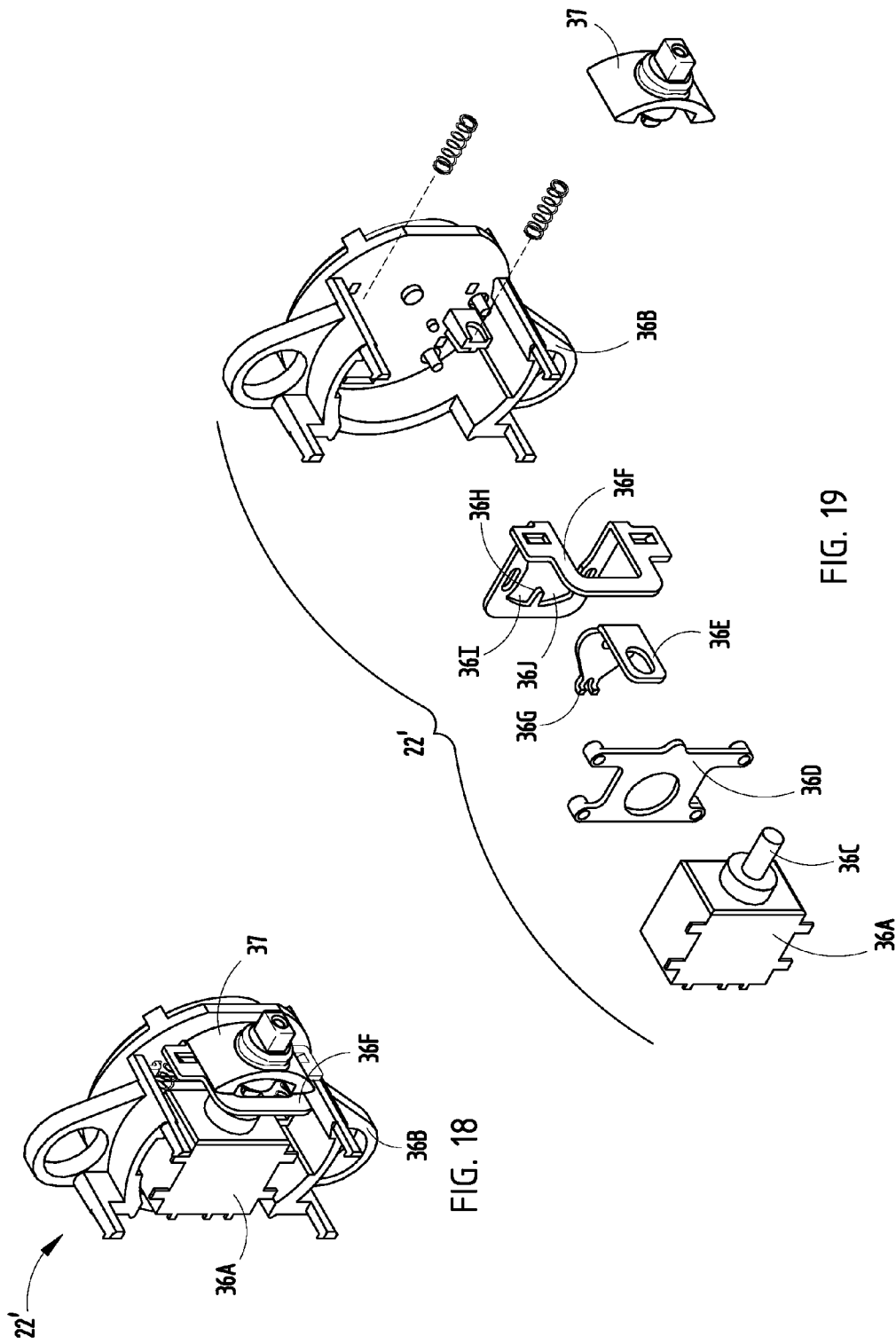

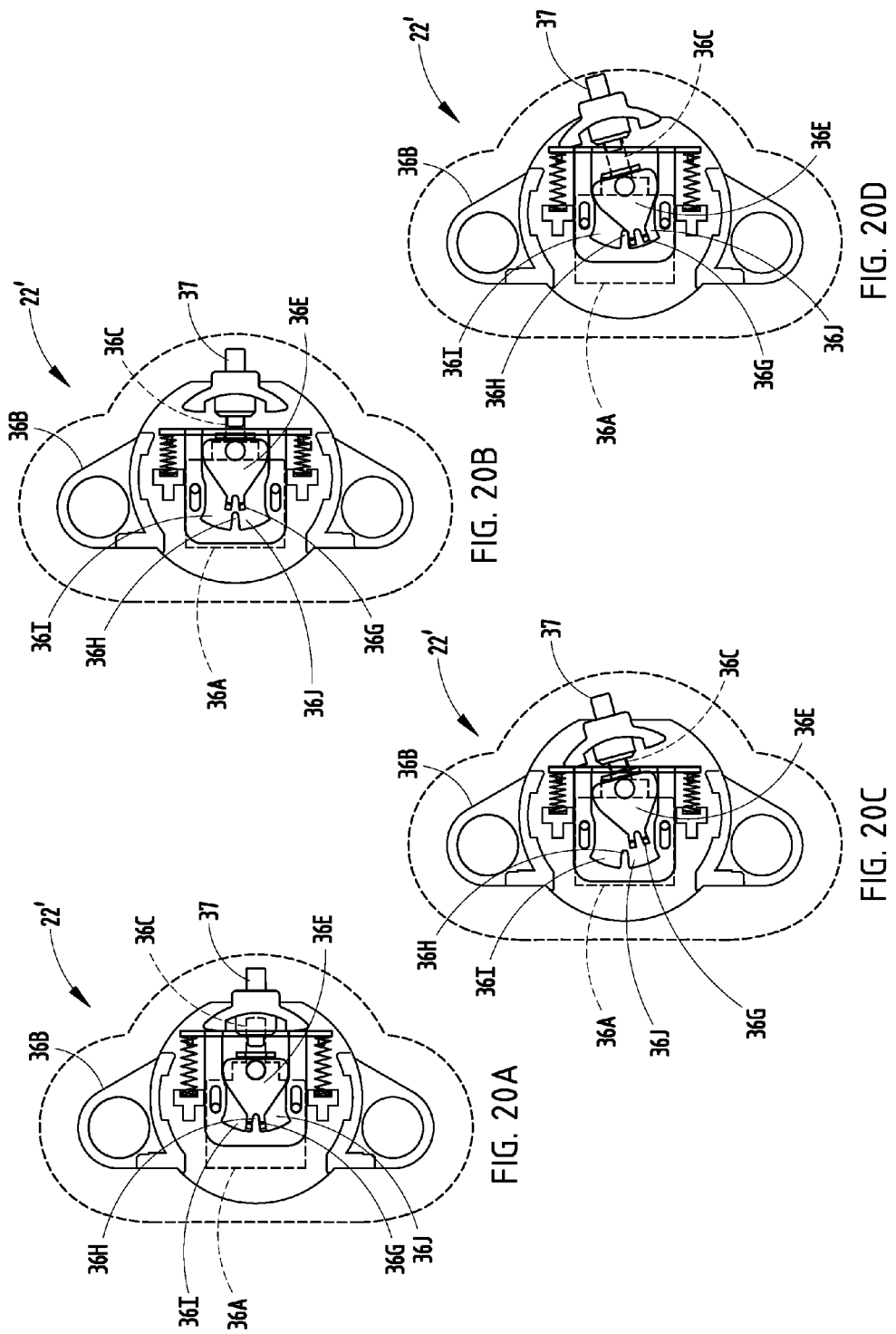

LIGHTING DEVICE HAVING LIGHT INTENSITY CONTROL

CROSS-REFERENCE TO RELATED APPLICATIONS

This application is a continuation of International Application PCT/US2008/067703, filed Jun. 20, 2008, which claims the benefit of U.S. Provisional Patent Application No. 60/945,197 filed on Jun. 20, 2007 and U.S. Provisional Patent Application No. 61/023,577 filed on Jan. 25, 2008, the entire disclosures of which are hereby incorporated by reference.

BACKGROUND OF THE INVENTION

The present invention generally relates to lighting devices and, more particularly, relates to a lighting device that has one or more batteries as the power source.

Portable lighting devices, such as flashlights and head worn lights, generally employ a light source, such as an incandescent lamp or one or more light emitting diodes (LEDs), a reflector or other optics, and a power source typically employing one or more electrochemical cell batteries. Some portable lighting devices are adapted to be worn on the head of a user, commonly referred to as a headlamp, whereas other lighting devices may be structurally mounted to a supporting structure.

It would be desirable to provide for a portable lighting device that provides for enhanced light illumination and enhanced features for use in the field.

SUMMARY OF THE INVENTION

In accordance with one aspect of the present invention, a lighting device is provided that has user adjustable intensity control. The lighting device includes a housing, a light source for generating a light beam, and a power source for providing power to the light source. The lighting device also includes a user actuatable switch that is actuatable by a user to turn the light source on and off and to further adjust intensity of the light beam. The lighting device further includes control circuitry for controlling activation and adjustment of intensity of the light beam in response to user actuation of the switch. The control circuitry cyclically switches among a plurality of intensity levels to adjust intensity of the light beam based on user actuation of the switch.

According to another aspect of the present invention, a lighting device is provided that has user adjustable intensity control. The lighting device includes a housing, a light source for generating a light beam, and a battery compartment provided in the housing and adapted to hold one or more batteries for providing power to the light source. The lighting device also includes a user actuatable switch that is actuatable by a user to turn the light source on and off and to further adjust intensity of the light beam. The lighting device further includes control circuitry for controlling activation and adjustment of intensity of the light beam in response to user actuation. The control circuitry switches among a plurality of intensity levels to adjust intensity of the light beam based on user actuation of the switch.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 1 is a front perspective view of a lighting device, according to one embodiment of the present invention;

FIG. 2 is a front perspective view of the lighting device shown in FIG. 1;

FIG. 3 is an enlarged front perspective view of the lighting device shown in FIG. 1;

FIG. 18 is a schematic diagram of a three-position toggle switch, according to a second switch embodiment;

FIG. 19 is an exploded assembly view of the three-position toggle switch shown in FIG. 18 according to the second switch embodiment;

FIGS. 20A-20D are cross-sectional views taken through the three-position toggle switch shown in FIG. 18 that show the switch in various positions for controlling the light sources of the lighting device;

DETAILED DESCRIPTION OF THE PREFERRED EMBODIMENTS

Figure 6:
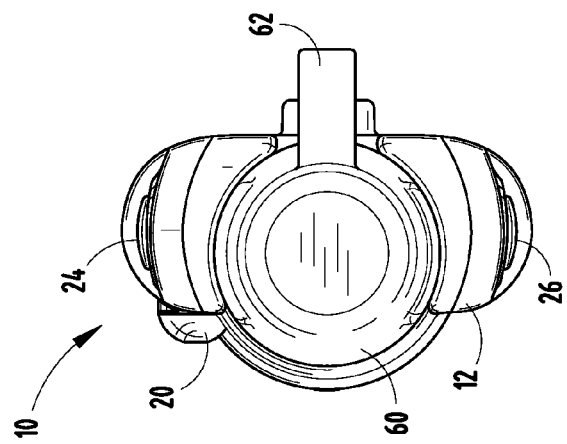
FIG. 6 is a rear view of the lighting device shown in FIG. 3.
Figure 5:
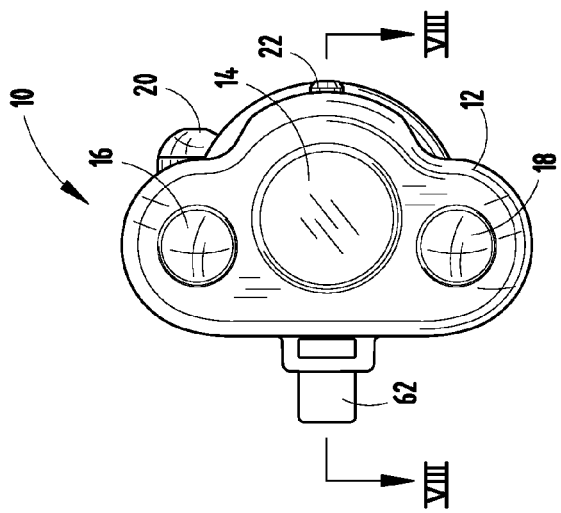
FIG. 5 is a front view of the lighting device shown in FIG. 3.
Figure 4:
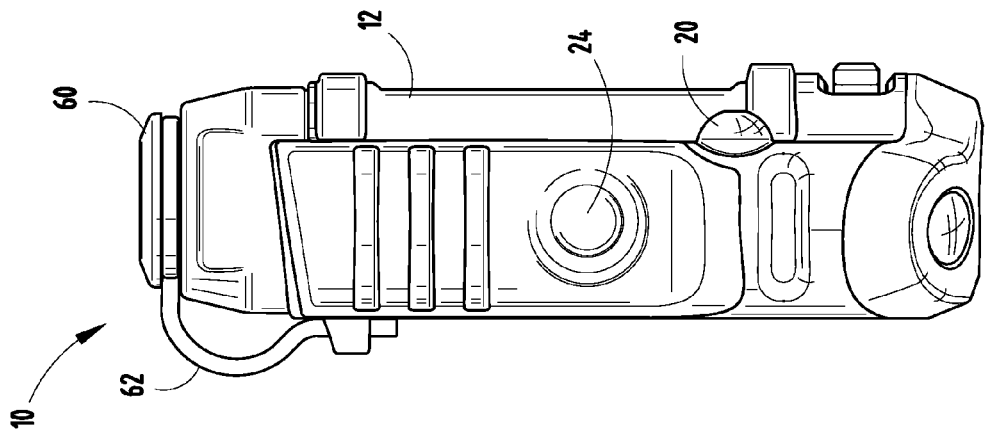
FIG. 4 is a bottom view of the lighting device shown in FIG. 3.

Before describing in detail embodiments that are in accordance with the present invention, it should be observed that the embodiments reside primarily in combinations of method steps and apparatus components related to a lighting device and method of operating thereof. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like reference characters in the description and drawings represent like elements.

In this document, relational terms, such as first and second, top and bottom, and the like, may be used to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional elements in the process, method, article, or apparatus that comprises the element.

Referring now to FIGS. 1-6, a portable lighting device 10 is generally illustrated to provide a user with lighting, according to one embodiment of the present invention. The lighting device 10 generally includes a light body 12. The light body 12 generally includes a housing that contains the various electrical and optical components of the lighting device 10. In the disclosed embodiment, the light body 12 has four light sources, namely three forward facing light emitting diodes (LEDs) 14, 16 and 18, and one side facing LED 20. In the disclosed embodiment, the central forward facing light source 14 is implemented as a white LED, also referred to as a non-colored LED, adapted to emit a forward projecting visible beam of non-colored (white) light illumination generally in the visible light spectrum having a wavelength in the range of about 420 nanometers to 680 nanometers, according to one embodiment. Light source 16 is implemented as an infrared (IR) LED for emitting a forward projecting beam of infrared (IR) illumination in the visible or invisible IR spectrum. The IR illumination may be in the invisible IR spectrum having a wavelength generally in the range of about 680 nanometers to 1.2 micrometers, according to one embodiment. The invisible IR is generally invisible to the naked eye, but may be viewable by a person with the use of night vision equipment (e.g., night vision goggles). Light source 18 is implemented as a colored LED for emitting a forward projecting beam of visible colored light in a colored illumination beam. According to one embodiment, the colored light LED 18 is a blue LED that illuminates visible blue light generally in the visible blue light spectrum having a wavelength in the range of about 400 to 500 nanometers, according to one embodiment.

According to one embodiment, the side facing light source 20 is employed as another light source that may include white light, colored light or IR. The light source 20 may operate intermittently to provide a blinking signal, according to one embodiment.

The light body 12 is further configured with a plurality of user actuatable control switches for controlling activation and illumination of the light sources 14, 16, 18 and 20. A first push-button switch 24 is located on the top gripping portion of the light body 12 and is actuatable by a user depressing the push-button switch 24. Switch 24 controls activation and illumination intensity of the visible white light source 14. Switch 24 is depressible to turn white light source 14 on and off and may be further actuatable to control the intensity (brightness) of the visible white light illumination beam as described herein. According to one embodiment, switch 24 may be actuated repeatedly to turn on and off the light source 14 and to sequentially change intensity of the white light emitted by light source 14 among a plurality of brightness settings, including high, medium and low intensity settings. According to another embodiment, switch 24 may be further actuated by continuous depression to adjust the white light intensity at more incremental settings by ramping the white light intensity up and down.

A second push-button switch 26 is located on the bottom handle portion of the light body 12. The second push-button switch 26 is likewise actuatable by a user to control illumination of the visible colored (blue) light source 18. Switch 26 may be depressed to activate light source 18 to turn the blue light source 18 on and off and may further be actuatable to control the illumination intensity (brightness) of colored light source 18. According to one embodiment, switch 26 may be actuated repeatedly to turn the colored light source 18 on and off and to sequentially change intensity of the colored light emitted by light source 18 among a plurality of brightness settings, including high, medium and low intensity settings. According to another embodiment, switch 26 may be further actuated by continuous depression to adjust the colored light intensity at more incremental settings by ramping the colored light intensity up and down.

The light body 12 further includes a three-position toggle switch 22 shown located on a lateral side of the light body 12. According to one embodiment, the toggle switch 22 is a three-position contact switch with three states configured to limit lighting operation to one light source at a time, and to prevent activation of other light sources. Specifically, the three-position switch 22 has a first side light position that activates the lateral side facing light source 20, a second "IR" position that activates the forward facing IR light source 16, and a third "off" position that keeps the first and second light sources off and enables operation of either the colored or non-colored visible light sources 14 and 18. In the third "off" position, the three-position switch 22 enables operation of either the visible white or colored light sources 14 or 18 when the corresponding switch 24 or 26 is actuated, and prevents activation of the IR light source 16 and other light source 20. In the second IR position, the three-position switch 22 activates the forward facing IR LED 16 and prevents other light sources from being activated. In the first side light position, the three-position switch 22 activates the side facing light source 20. In this first switch position, no other light sources may be activated. Thus, the three-position switch 22 controls which light sources may be activated and which light sources are deactivated, and prevents simultaneous activation of two or more of the light source 20, IR light source 16 and visible light sources 14 or 18.

Figure 7:
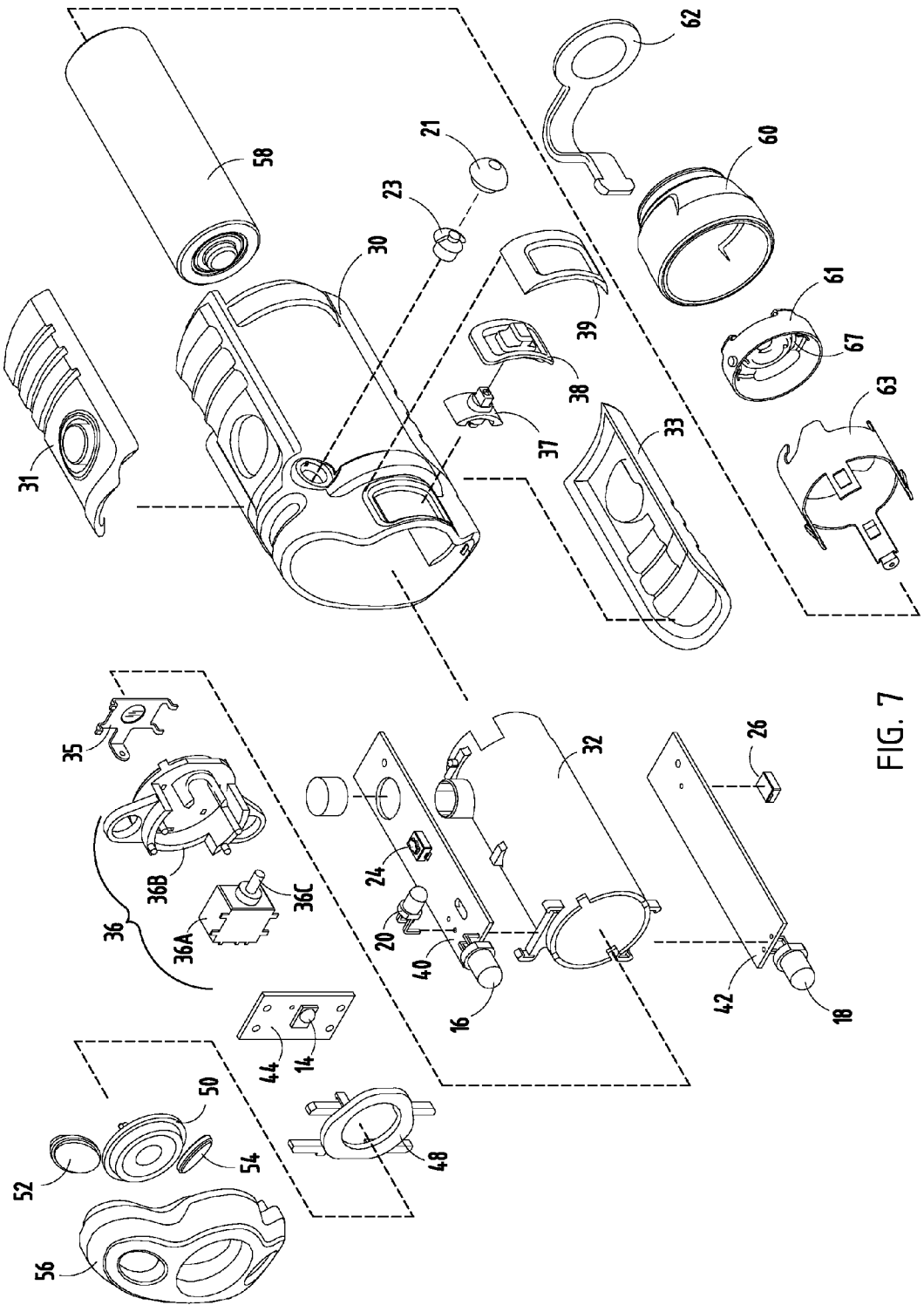
FIG. 7 is an exploded view of the light body of the lighting device shown in FIG. 3.
Figure 8:
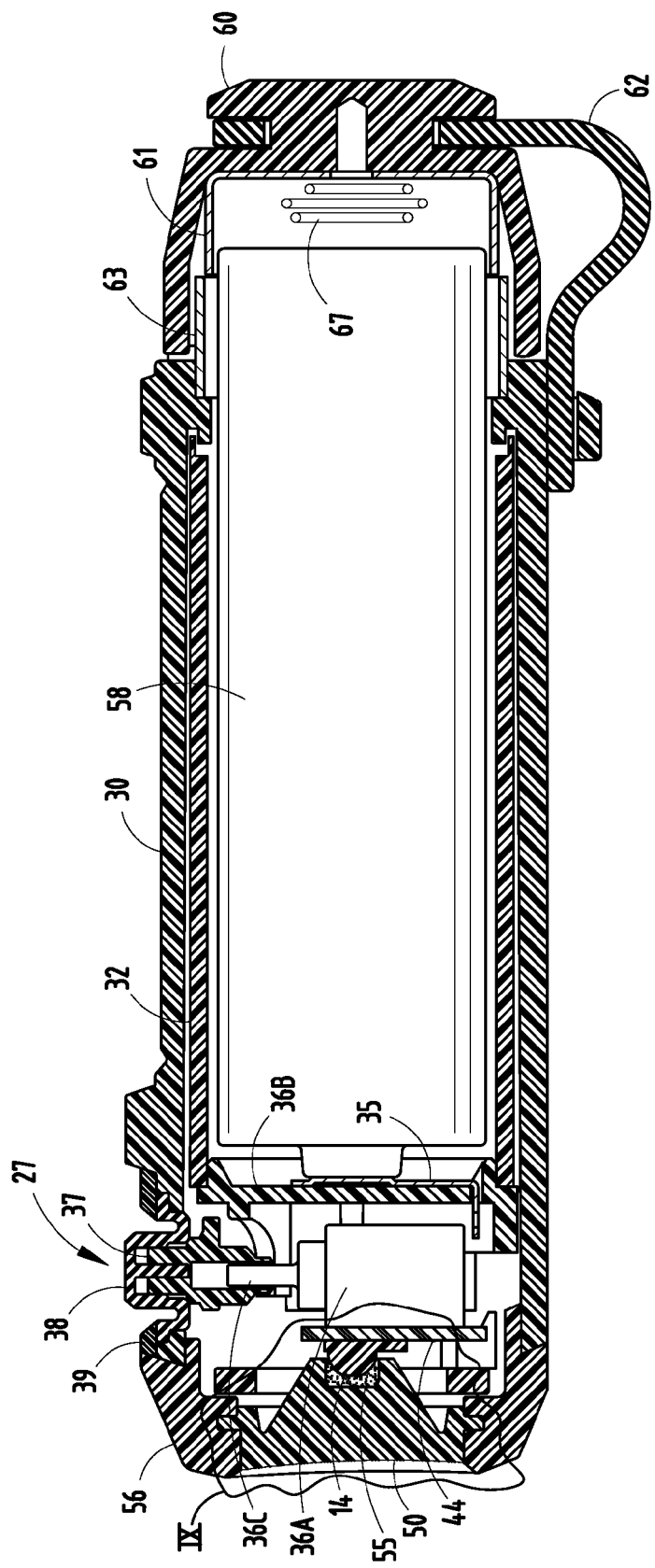
FIG. 8 is a cross-sectional view of the lighting device taken through lines VIII-VIII of FIG. 5.

Referring to FIGS. 7 and 8, the assembly of the light body 12 is further illustrated having a housing generally including a main housing body 30 with upper and lower grips 31 and 33 adhered, overmolded, or otherwise attached thereto, a front housing body 56, and a rear end cap 60. Disposed within main body housing 30 is a generally cylindrical battery compartment 32 for receiving one or more batteries 58 as the power source. In the disclosed embodiment, a single cell battery 58 is employed to provide a power source voltage of about 1.5 volts. The battery 58 serves as a power source for providing electrical power to power the light sources and control circuitry. While a single 1.5 volt battery is shown and described herein as the power source, it should be appreciated that single or plural batteries in various sizes, shapes, power and voltage configurations may be employed to provide electrical power as the power source.

The rear end cap 60 threadingly engages the rear end of main housing body 30 and serves as a removable cover that may be twisted on and off to allow replacement of the battery 58. The end cap 60 generally includes electrical contacts 61 and 63 that are disposed in the interior of end cap 60 to provide contact with battery 58 and electrical current paths. Contact 61 has a spring 67 as should be evident to those in the art to spring bias the battery 58 into contact with electrical contacts 35 and 61 at opposite end terminals of the battery 58. Additionally, the end cap 60 is connected to an end loop of a tether 62 which, in turn, is connected to the main body 30 of light body 12. The tether 62 may be flexible such that it bends and may slide within a holder on the main body 30. The tether 62 serves to retain the end cap 60 attached to the light body 12 during removal of the end cap 60 from housing body 30 to allow for insertion and removal of a battery 58 without misplacing the end cap 60. It should be appreciated that a gasket may be disposed between end cap 60 and housing body 30 to facilitate a watertight closure.

The light body 12 further includes one or more circuit boards which may be implemented as LED printed circuit boards having circuit components including one or more LEDs, switches and electrical circuit traces and contacts formed thereon for providing control circuitry and electrical circuit connections. In the embodiment shown, three circuit boards 40, 42 and 44 are shown disposed within the main housing body 30. The first circuit board 40 is shown having circuit contacts of switch 24 connected thereto. Additionally, IR light source 16 is connected to the first circuit board 40 at the forward end. Electrical circuit traces are provided on the first circuit board 40 to allow switch 24 and control circuitry to control activation of IR light source 16. According to one embodiment, the IR LED 16 may include Part No. GB-IR224B31C-015, commercially available from Globe Technology Component.

Additionally, the side facing light source 20 is also shown connected to the first circuit board 40. The electrical circuitry provided on the circuit board 40 also allows activation of the light source 20. The light source 20 extends through an opening in the side of the main housing body 30 aligned behind optical lens 23 and protective cover 21. Illumination of the light source 20 provides a spot indicator at lens cover 21 that is viewable at the side.

The second circuit board 42 has circuit contacts of switch 26 connected thereto. Additionally, colored light source 18 is connected to circuit board 42 at the forward end. Circuit board 42 likewise has electrical circuitry, such as circuit traces, coupling switch 26 and control circuitry to colored light source 18 to allow control thereof. The first and second circuit boards 40 and 42 are generally shown arranged parallel to one another and disposed on opposite upper and lower outer sides of the battery compartment 32. According to one embodiment, the colored blue LED 18 may include Part No. GB-333B473C-032, commercially available from Globe Technology Component.

The third circuit board 44 is located at the forward end of housing body 30 and is arranged orthogonal to first and second circuit boards 40 and 42. The main white LED 14 is mounted to the front facing side of circuit board 44. The circuit board 44 likewise has electrical circuitry, such as circuit traces, provided thereon to supply power to the white LED 14 and allow activation of the white LED 14. According to one embodiment, the main white LED 14 may include Luxeon® Rebel having Part No. LXML-PWC1-0100, commercially available from Philips Lumiled.

The white LED 14 generally provides a higher light intensity output than the other light sources 16, 18 and 20. According to one embodiment, the white LED 14 may typically be driven at a current of approximately 120 milliamps to achieve about 40 lumens of light illumination, whereas the IR LED 16, colored LED 18 and side light LED 20 may typically be driven at approximately 30 milliamps to achieve approximately 10 lumens of light illumination for each light source. It should be appreciated that the white LED 14 thereby serves as the main light source for providing the greatest amount of illumination. However, it should be appreciated that the amount of illumination achieved with each of the lighting sources 14, 16, 18 and 20 may be varied according to other embodiments.

Disposed adjacent to the backside of circuit board 44 is the three-position toggle switch 36. Switch 36 generally includes PCB IR switch box 36A assembled to an electronics frame 36B. The toggle switch 36 has a toggle arm or pin 36C that extends from switch box 36A through a switch opening in the main housing body 30 and is assembled to an actuator member 37. Actuator member 37, in turn, fits within and engages an overlaying rubber boot 38 that flexes when switch 36 is actuated and provides a water tight seal to close the switch opening in the main housing body 30. A fascia cover 39 lays over the top perimeter of the rubber boot 38. In one embodiment, the three-position switch 36 is actuated by applying lateral force to slide toggle member 37 and pin 36C into one of three contact positions. According to another embodiment, the three-position switch 36 is actuated by first depressing the toggle member 37 by pushing downward on boot 38 and actuator member 37 and then applying lateral force to slide or rotate the switch 36 into one of three contact positions.

Figure 9:
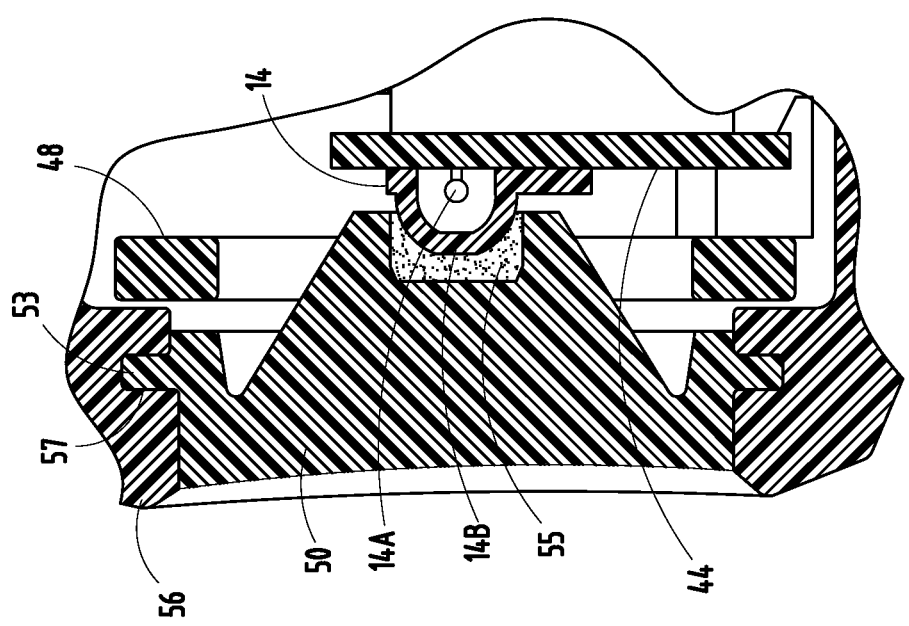
FIG. 9 is an enlarged cross-sectional view of section IX taken from FIG. 8 further showing the optics pack.

Disposed in front of the forward facing light sources 14, 16 and 18, are optical lenses for focusing each of the corresponding forward directed light beams in a desired beam pattern. A total internal reflectance (TIR) optical lens 50 is disposed in front of the main white LED 14. The TIR lens 50 may be made of a thermoplastic and transparent plastic, also referred to as acrylic glass. One example of a suitable acrylic glass is polymethyl methacrylate (PMMA). In an exemplary embodiment, the TIR lens 50 may include a TIR Rebel lens with an O-ring that may be injection molded. Lens 50 is shown in FIGS. 8 and 9 disposed in the front housing body 56 by way of a collar 53 trapped within channel 57. Thus, the optical lens 50 is disposed in front of the white LED 14 and is spaced therefrom by a distance. The TIR lens 50 is generally conical or frustoconical (in the shape of a frustum of a cone) with a recess provided at the vertex end for receiving the LED 14. TIR lens 50 internally reflects and collimates light and transmits the light into a desired collimated beam pattern. In one exemplary embodiment, the TIR lens 50 has a maximum diameter of twelve millimeters (12 mm) and achieves an efficiency of at least eighty-eight (88) percent. In a specific embodiment, fifty (50) percent of light generated by LED 14 is transmitted by TIR lens 50 within a window of ±thirteen (13) degrees.

The white LED 14 is generally configured as an LED package that includes a powered LED component 14A and a primary optical lens 14B. The primary optical lens 14B may include a silicone lens that provides an optical path for light generated by LED component 14A to pass forward in a desired beam pattern. Disposed between the primary optical lens 14B and the optical lens 50, also referred to herein as a secondary optical lens, is a light transparent medium, in the form of a gel 55. The light transparent gel 55 is disposed between the primary optic lens 14B and the secondary optical lens 50 to enhance or optimize the efficiency of the light transmission between the two lenses 14B and 50. The light transparent gel 55 may include a transparent silicone, according to one embodiment. According to one example, the silicone may be a silicone adhesive, such as Part No. OE-6450, commercially available from Dow Corning. In this example, the silicone adhesive may have a thickness of about 1 millimeter and may not be hardened such that it does not set and remains in a gel state. The transparent gel 55 may be applied as a gel encapsulant for the LED package. It should be appreciated that the LED component 14A and its primary optic lens 14B together with the secondary optic lens 50 and the light transparent gel 55 provides for an optics package for the lighting device 10. According to a further embodiment, a light transparent gel may be disposed between the LED component 14A and primary optics lens 14B to enhance light transmission therebetween.

According to one example, the primary optical lens 14B has an index of refraction of approximately 1.6, the secondary optical lens 50 has an index of refraction of about 1.5, and any unoccupied area filled with air has an index of refraction of about 1.0. The light transparent gel has an index of refraction that substantially matches the index of refraction of at least one of the primary optical lens 14B and the secondary optical lens 50. According to an exemplary embodiment, the light transparent gel 55 has an index of refraction of about 1.54. More generally, the light transparent gel 50 has an index of refraction generally greater than 1.0, such as 1.1 or greater and has an index of refraction generally between the index of refraction of the primary and secondary optic lenses 14B and 50. According to one embodiment, the light transparent gel 55 has an index of refraction between 1.0 and 2.0.

By enhancing the index of refraction in the region between the primary optical lens 14B and the secondary optical lens 50, losses that would otherwise occur at the interface between each of the primary and secondary optical lenses 14B and 50 and an otherwise open air gap are eliminated such that the light illumination is more efficiently transmitted from the primary optical lens 14B to the secondary optical lens 50. The light transparent gel 55 reduces variations in index of refraction from the primary optical lens 14B to the secondary optical lens 50 so as to reduce interface loses that would otherwise occur due to larger index of refraction mismatches.

The light transparent gel 55 may be injected as a fluidous gel to completely fill the void region between the primary lens 14B and secondary lens 50 to substantially eliminate open air gaps so as to maintain a substantially matched index of refraction at the interface regions of the primary and secondary optical lenses 14B and 50. The light transparent gel 55 may be applied as a gel, such as a liquid that flows into the region between the primary optical lens 14B and the secondary optical lens 50. Subsequently, the light transparent gel 55 may be at least partially cured, according to one embodiment. The use of a light transparent gel 55 enables the air gap to be substantially filled in such that the gel 55 is conformal to the surface contour of the primary and secondary optical lenses 14B and 50. Additionally, it should be appreciated that the light transparent gel 55 may include a colored die that may provide color to the light illumination.

Disposed in front of IR light source 16 is an IR optical lens 52. The infrared lens may include Part No. 0.1*, commercially available from Fresnel Technologies, Inc. The IR lens 52 may include a fresnel lens for collimating the infrared radiation into a desired beam pattern. Similarly, disposed in front of the colored blue light source 18 is a blue optical lens 54. The blue colored optical lens 54 may include a fresnel lens having Part No. 0.1*, commercially available from Fresnel Technologies, Inc. The blue optical lens 54 may include a fresnel lens for collimating the colored blue light into a desired beam pattern. According to various embodiments, the optical lenses 52 and 54 may be conical TIR lenses, fresnel lenses or other optics. It should further be appreciated that a light transparent gel 55 may also be disposed between LED 16 and optical lens 52, as well as between LED 18 and optical lens 54, according to further embodiments to further enhance the light transmission therebetween. Lenses 50, 52 and 54 are generally positioned in corresponding openings provided in the front facing portion of front housing body 56.

Additionally, a thermally conductive member 48 generally receives the TIR lens 50 and abuts the inner surface of the front housing body 56. Thermally conductive member 48 is made of a thermally conductive material that acts as a heat sink to dissipate thermal energy (heat) away from the white LED 14. Heat sink 48 also dissipates thermal energy away from LEDs 16 and 18. By dissipating thermal energy away from the light sources 14, 16 and 18, enhanced performance of the lighting sources may be realized.

The housing of light body 12 which generally includes the main housing body 30 with upper and lower grips 31 and 33, the front housing body 56, and the rear end cap 60 is generally made up of an impact resistant material capable of withstanding adverse use in the field. According to one embodiment, the housing may be made up of a thermoplastic such as acrylonitride-butadiene-styrene (ABS). According to a second embodiment, the material may be made up of a nylon-ABS blend, which offers a good combination of stiffness and toughness. Examples of a nylon-ABS blend include Nylon 66/6 which is a copolymer offering dimensional stability and good impact resistance. Examples of a nylon-ABS blend include Lumid® Hi-5006 A, commercially available from LG Chemical Ltd., Excelloy AK15 (DRIE), commercially available from Techno Polymer America, Inc., and Toyolac® SX01, commercially available from Toray Resin Company. According to other embodiments, the housing of light body 12 may be made of a nylon, such as an impact modified and/or glass filled nylon, with the elastomer blended into the nylon for optimal toughness. A further embodiment of the housing material may include a polycarbonate.

The components of the housing and other components connected thereto may be held in place with an adhesive. The adhesive may include adhesives from the following families: cyanoacrylites, epoxies and urethanes. It should be appreciated that the aforementioned adhesives are commercially available under the brand name Loctite® from Henkel Corporation.

The lighting device 10 may be employed as a portable handheld lighting device, according to one embodiment. According to other embodiments, the lighting device 10 may be connected to a supporting structure, such as an article of clothing (e.g., hat). To accommodate mounting to a support structure, the lighting device may include a connecting structure (not shown).

Figure 10:
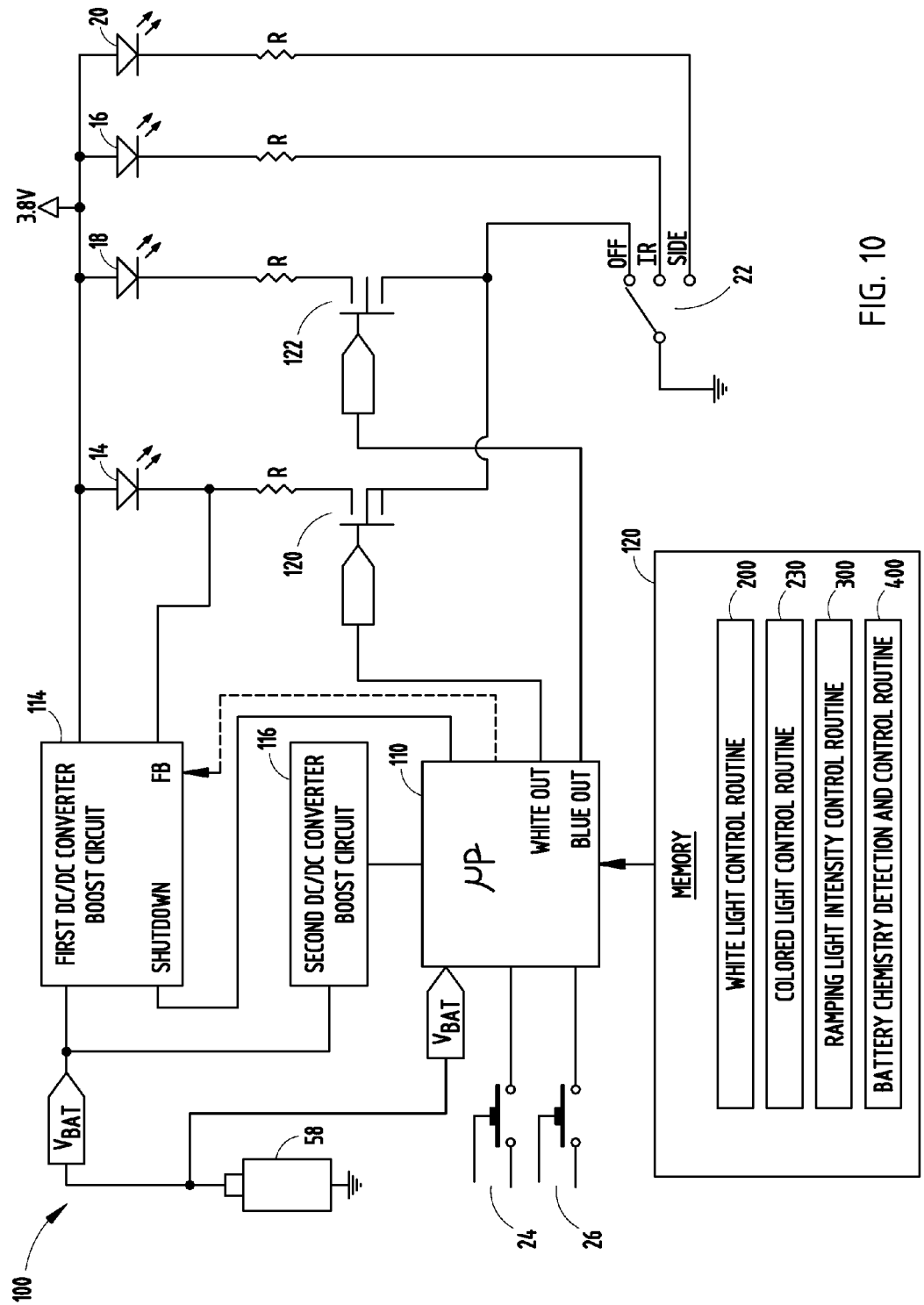
FIG. 10 is a block/circuit diagram illustrating control circuitry for controlling operation of the lighting device, according to one embodiment.

The lighting device 10 includes control circuitry 100 for controlling operation of the light sources 14, 16, 18 and 20. The control circuitry 100 is generally illustrated in FIG. 10, and specific control circuitry is further illustrated in FIGS.

11A-13 according to various disclosed embodiments. As seen in FIG. 10, the control circuitry 100 includes a microprocessor 110 coupled to memory 112. The microprocessor 112 may include any signal processing device capable of processing switch inputs, executing routines, and generating control signals as described herein. Memory 112 may include volatile and nonvolatile memory devices, such as electronically erasable programmable read-only memory (EEPROM), flash memory, or other known memory devices. Stored within memory 112 are a plurality of routines including a visible white light control routine 200 for controlling activation and intensity of the visible white light source 14, a colored light control routine 230 for controlling activation and intensity of the colored light source 18, a battery chemistry detection and control routine 400 for detecting the type of electrochemical cell battery employed and controlling the lighting device 10 based on the detected type of cell employed, and a ramping light intensity control routine 300 for controlling illumination intensity of either of the white and colored light sources 14 and 18 in a cyclical ramping mode, according to one embodiment.

The control circuitry 100 further includes boost control circuitry for supplying a substantially constant current or substantially constant voltage to one or more of the light sources 14, 16, 18 and 20, which are shown as light emitting diodes, and are generally connected to the three-position switch 22. In certain disclosed embodiments, the boost circuitry includes a first DC/DC converter boost control circuit 114 generally coupled to the LEDs 14, 16, 18 and 20 for controlling power supplied to the LEDs. In certain embodiments, the boost control circuit 100 further includes second DC/DC converter boost control circuitry 116 that controls power supplied to the microprocessor 110. In such embodiments, the first boost control circuitry 114 may be turned off such that no power is supplied to the light sources when all light sources of the lighting device 10 are turned off, whereas power may be supplied periodically or continuously to the microprocessor 110 by way of the second boost circuit 116. The first and second boost circuits 14 and 16 receive power from the battery 58 at a voltage potential $V_{BAT}$. In the disclosed single battery cell embodiment, $V_{BAT}$ is about 1.5 volts. Additionally, the voltage $V_{BAT}$ is supplied to the microprocessor 110. The microprocessor 110 also receives inputs from each of the visible white light switch 24 and the colored light switch 26.

The microprocessor 110 processes the inputs from switches 24 and 26 and executes routines 200, 230, 300 and 400 stored in memory 112 and controls the activation and intensity of the visible white and blue light sources 14 and 18, whenever the three-position switch 22 is in the off position. The first boost control circuit 114 supplies a boost rail voltage of 3.8 volts that serves to power LEDs 14, 16, 18 and 20. According to one embodiment, the microprocessor 110 provides a pulse width modulated (PWM) output signal to each of the transistors (e.g., MOSFETs) 120 and 122 to control current flow through LEDs 14 and 18, and thus the activation and intensity of the visible light emitted by the visible light sources 14 and 18. Alternately, the microprocessor 110 could provide a pulse width modulated (PWM) output signal to the first DC/DC converter boost circuit 114 shutdown input to control the intensity of the light emitted by the visible light sources 14 and 18, while MOSFETs 120 and 122 are used to control which light sources 14 and/or 18 are receiving power. Thus, when the microprocessor 110 outputs a signal on either of MOSFETs (transistors) 120 and 122, and the three-position switch 22 is in the "off" position, power is supplied to the corresponding light source 14 or 18 at a light intensity determined by the microprocessor 110, which generally is in response to activation of the respective user input actuation of switches 24 or 26. The microprocessor generated outputs for controlling light intensity for a light source may be output at a predetermined number of levels, such as a high, medium and low intensity, or may be continuously ramped up and down, according to two disclosed embodiments.

When the three-position switch 22 is actuated into the "IR" position, electrical current is supplied through the IR light source 16 and a resistor R and to ground to operate light source 16, and no other light sources are operable in that position of switch 22. When switch 22 is actuated into the "side" position, electrical current is supplied through the side LED 20 and resistor R and to ground to operate the light source 20, and no other light sources are operable in that position. Thus, the three-position switch 22 thereby ensures that the side light mode, IR mode and visible light modes cannot operate at the same time.

Figure 11A:
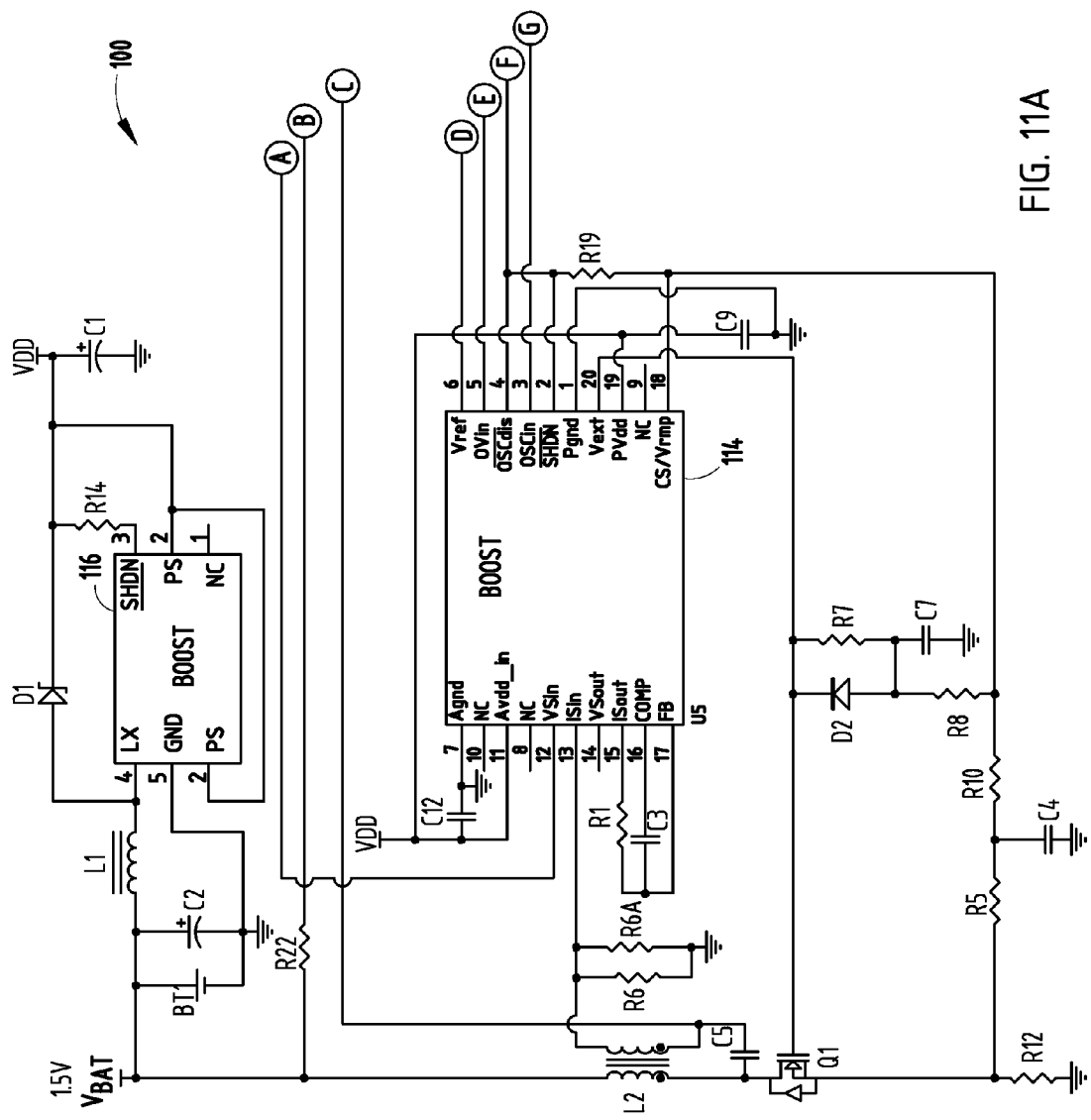
FIGS. 11A and 11B are a circuit diagram showing implementation of the control circuitry, according to a first embodiment.
Figure 11B:
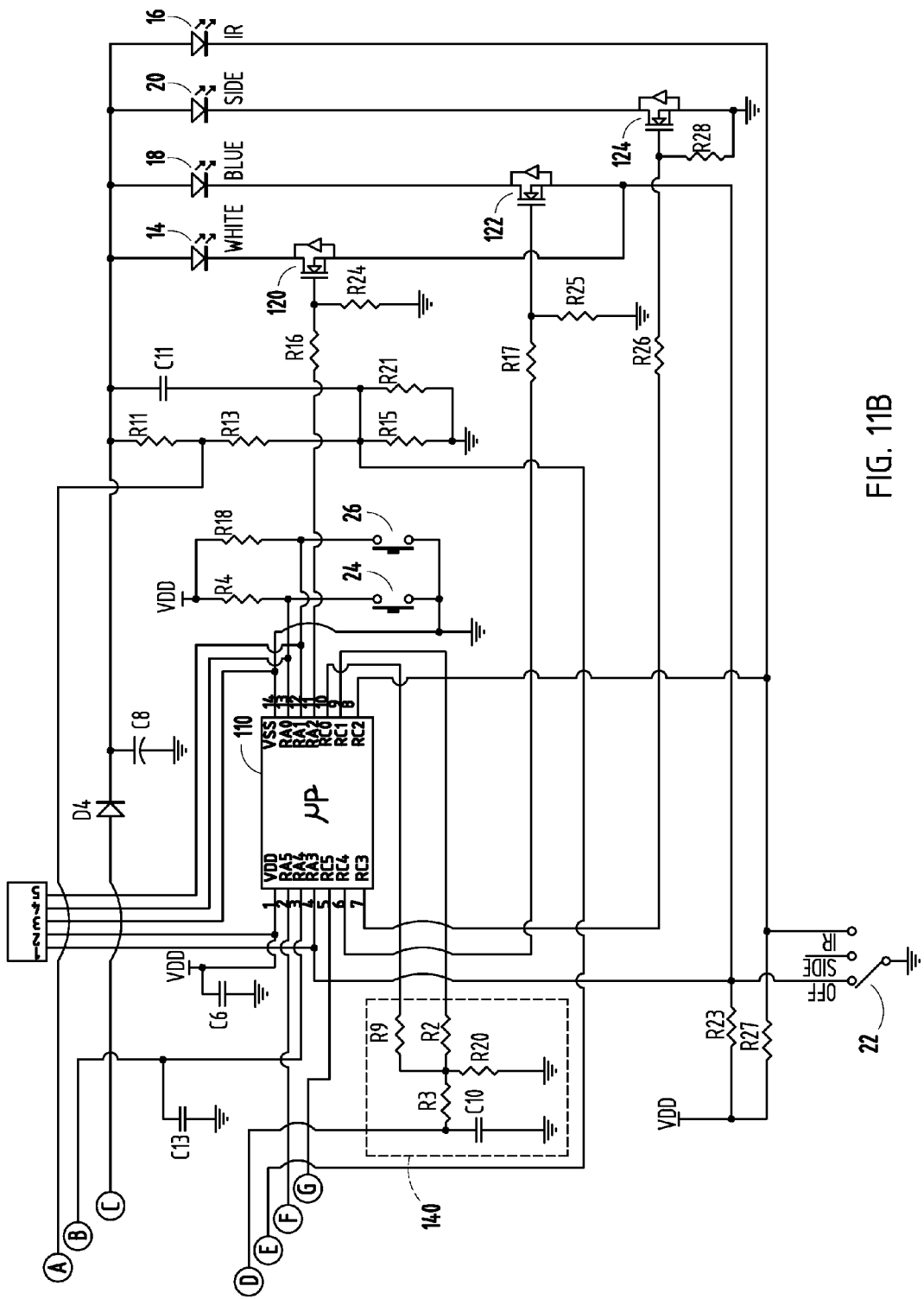

Referring to FIGS. 11A and 11B, one example of the boost control circuitry 100 is illustrated providing a substantially constant current to the lighting sources according to a first boost circuit embodiment. The control circuitry 100 is shown having a microprocessor 110 providing output control signals to transistors 120 and 122 to control activation and light intensity of the main white LED 14 and colored LED 18. Transistor 124 is used to control the blinking of the side LED 20. The IR LED 16 is controlled in response to switch 22 actuated into the IR position to complete the rail voltage to ground connection through IR LED 16. The position of switch 22 is detected by microprocessor 110 sensing that switch 22 is not in either of the off or IR positions. The microprocessor 110 is connected to a resistor network 140 on pin RC0 that also connects to the $V_{ref}$ input of the main boost circuit 114 at pin 6. The main boost circuit 114 thereby provides one or more output levels based on the state of the microprocessor 110 output on pin RC0. This allows the microcontroller 110 to control the output level of the main boost circuit 114 by means of software routines. This output level may be changed based on the detected battery chemistry presented to the microprocessor 110 at pin 3 labeled RA4.

The battery voltage $V_{BAT}$, supplied at 1.5 volts according to one embodiment, is supplied to inductors L1 and L2. Inductor L2 is a mutually coupled inductor which supplies a substantially constant current through diode D4 on the rail that powers light sources 14, 16, 18 and 20. Inductor L2 with first boost circuit 114 thereby provides electrical energy at a substantially constant current to the rail. A transistor Q1 serves as a main power switch for the first boost circuit 114. It should be appreciated that resistors R11, R13, R15 and R21 and capacitor C11 provide a voltage divider to monitor for over voltage which is sensed at pin 5 of the main boost converter 114.

The second boost circuitry 116 is generally coupled to inductor L1 which steps up the battery supplied voltage from 1.5 volts to about 3.0 or 3.3 volts to serve as voltage $V_{DD}$. The second boost circuit 116 serves as a boost for the voltage $V_{DD}$ and provides stable operating voltage and/or power to the microprocessor 110.

The three-position switch 22 allows for switching amongst the visible, IR and side light positions. The three-position switch 22 also serves as a return path to ground for electrical current for both the visible white and blue LEDs 14 and 18. The IR LED 16 also passes current to ground when switch 22 is in the IR position.

Figure 12:
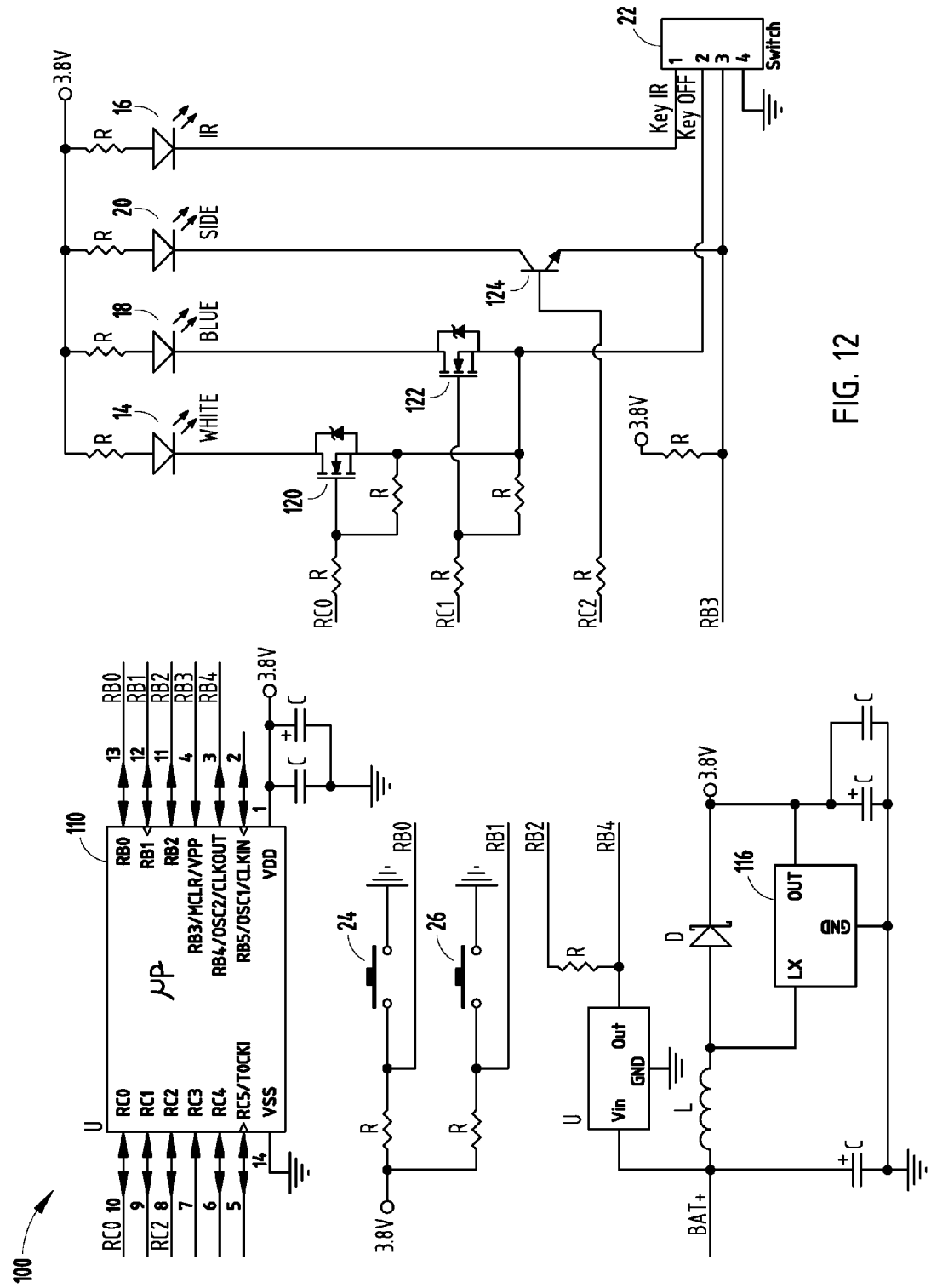
FIG. 12 is a circuit diagram illustrating implementation of the control circuitry, according to an alternate second embodiment.

Referring to FIG. 12, an alternate second control circuit 100 is shown providing a substantially constant voltage to the light sources 14, 16, 18 and 20. In this second embodiment, a single boost circuit configuration is employed. The control circuitry 100 generally illustrated in FIG. 12 includes microprocessor 110 having outputs coupled to transistors 120, 122, 124 for controlling white light LED 14, colored LED 18 and side LED 20, respectively. The microprocessor 110 receives as inputs signals from switches 24 and 26 on lines RB0 and RB1 which are generated in response to user activation.

Control circuitry 100 includes a single boost circuit 116 in FIG. 12 for providing a rail voltage of 3.8 volts that serves as a substantially constant voltage supply of 3.8 volts for powering light sources 14, 16, 18 and 20. Additionally, the boosted 3.8 volts is used to power the microprocessor 110. The single boost circuitry 116 generally includes an inductor L coupled to the battery which supplies the voltage of about 1.5 volts. The voltage of 1.5 volts is stepped up by inductor L to 3.8 volts and serves as the rail voltage. Coupled between the rail supplying 3.8 volts and each of the light sources 14, 16, 18 and 20 are resistors R that serve as current limiting resistors. With the three-position switch 22 in the IR position, current flows from the rail of 3.8 volts through IR LED 16 and then to ground through the three-position switch 22, which is shown having four terminals, with one terminal connected to ground. With the three-position switch 22 in the side light position, current flows from the rail voltage of 3.8 volts through the side LED 20 as controlled by transistor 124 to ground through the switch 22. With the three-position switch 22 in the off position, current may flow through either LED 14 or LED 18 from the 3.8 volt rail to ground as controlled by transistors 120 and 122.

Thus, the second embodiment of the control circuitry 100 allows for the use of a single boost circuit to supply a substantially constant rail voltage for supplying electrical power to the light sources 14, 16, 18 and 20. In order to make efficient use of the battery power source 58, it should be appreciated that the boost circuit and other control circuitry may be periodically powered on and off to operate in a wake up mode so that electrical current is not continually transmitted through circuitry to drain the battery power source 58.

Figure 13:
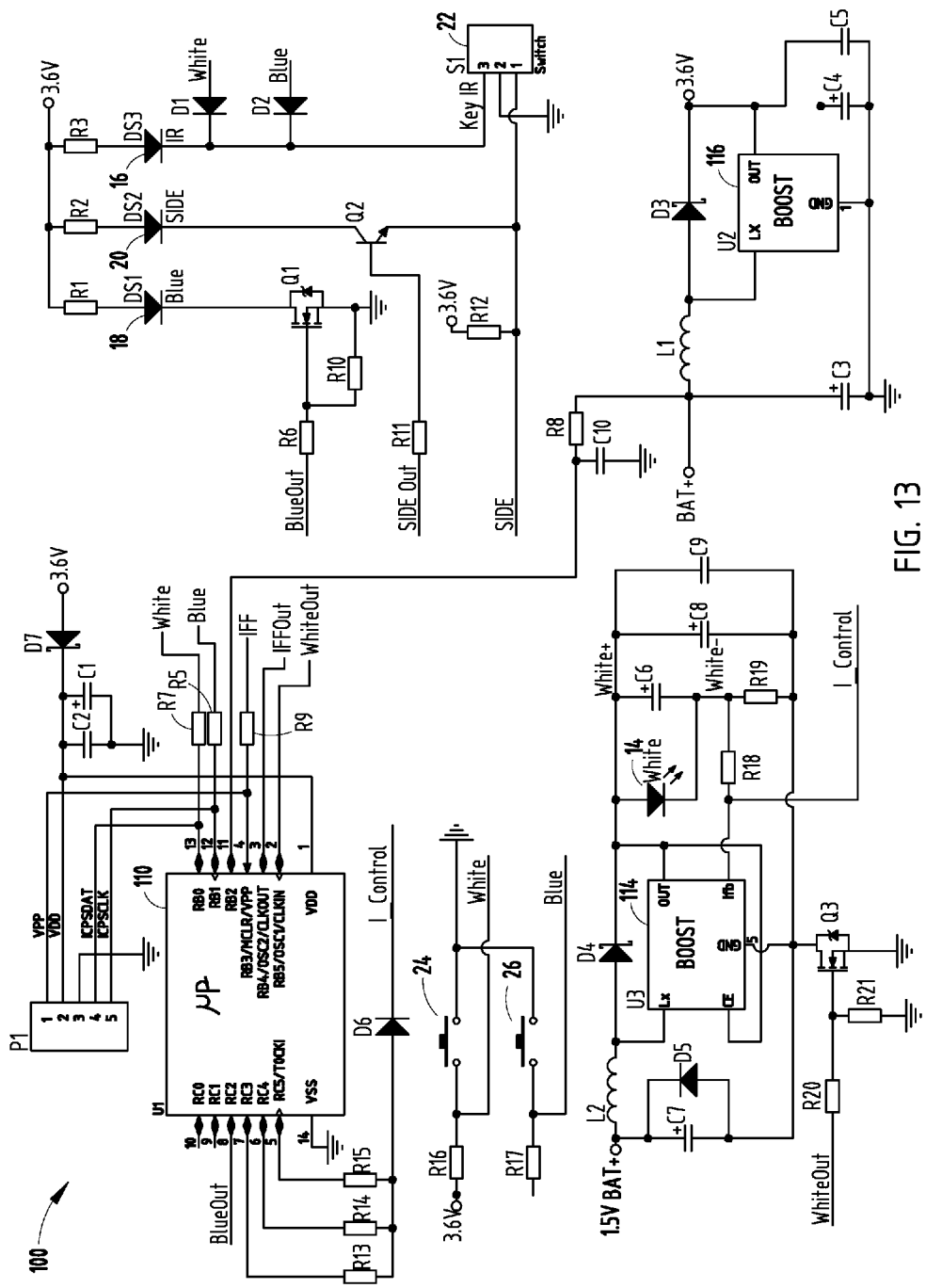
FIG. 13 is a circuit diagram illustrating implementation of the control circuitry, according to a third embodiment.

Referring to FIG. 13, the control circuitry 100 is shown according to a third embodiment employing first and second boost circuitry 114 and 116. The control circuitry 100 shown in FIG. 13 employs microprocessor 110, and first and second boost circuits 114 and 116 to provide for another double boost circuit embodiment. In this embodiment, the first boost circuit 114 serves as a current regulator to provide a substantially constant current to the white LED 14, using pulsed frequency modulation (PFM). Thus, the boost circuitry 114 provides current regulation which is generally achieved by the use of inductor L2 to power the highest intensity LED 14. With the three-position switch 22 in the off position, the white LED 14 is activated by switch 24 and transistor Q3 is used to turn off the white LED 14.

The pulsed frequency modulation (PFM) provided by the first boost circuitry 114 is used to control activation and intensity of the white LED 14. Thus, by pulsing the frequency modulation of the signal, the intensity of the white LED 14 may be adjusted to achieve a desired brightness in response to activation of the corresponding user actuatable switch 24. While pulsed frequency modulation is disclosed in this embodiment, it should be appreciated that other forms of intensity control, such as pulse width modulation (PWM) may be employed to control intensity of one or more of the lighting sources 14, 16, 18 and 20.

The second boost circuit 116 is shown coupled to the battery voltage of 1.5 volts and inductor L1 to provide a 3.6 voltage rail which is supplied to LEDs 16, 18 and 20. The second boost circuit 116 regulates the current provided to the colored LED 18, side LED 20 and IR LED 16. Thus, the second boost circuit 116 provides a rail voltage of 3.6 volts and regulates the current provided to the three LEDs 16, 18 and 20 connected to the rail voltage. The three-position switch 22 is shown providing an IR position for controlling activation of the IR LED 16 by allowing current to flow from the 3.6 volt rail through resistor R3 and LED 16 to ground. In the side light position of three-position switch 22, current flows from the 3.6 volt rail through resistor R2, ILED 20, and transistor Q2 to ground. With the three-position switch 22 in the off position, the blue LED 18 may be controlled by way of transistor Q1. The control circuitry 100 is shown powered by a battery supplying 1.5 volts, however, it should be appreciated that control circuitry 100 can operate at various other voltage potentials, such as 3.0 volts supplied by two battery cells connected in series.

Figure 14:
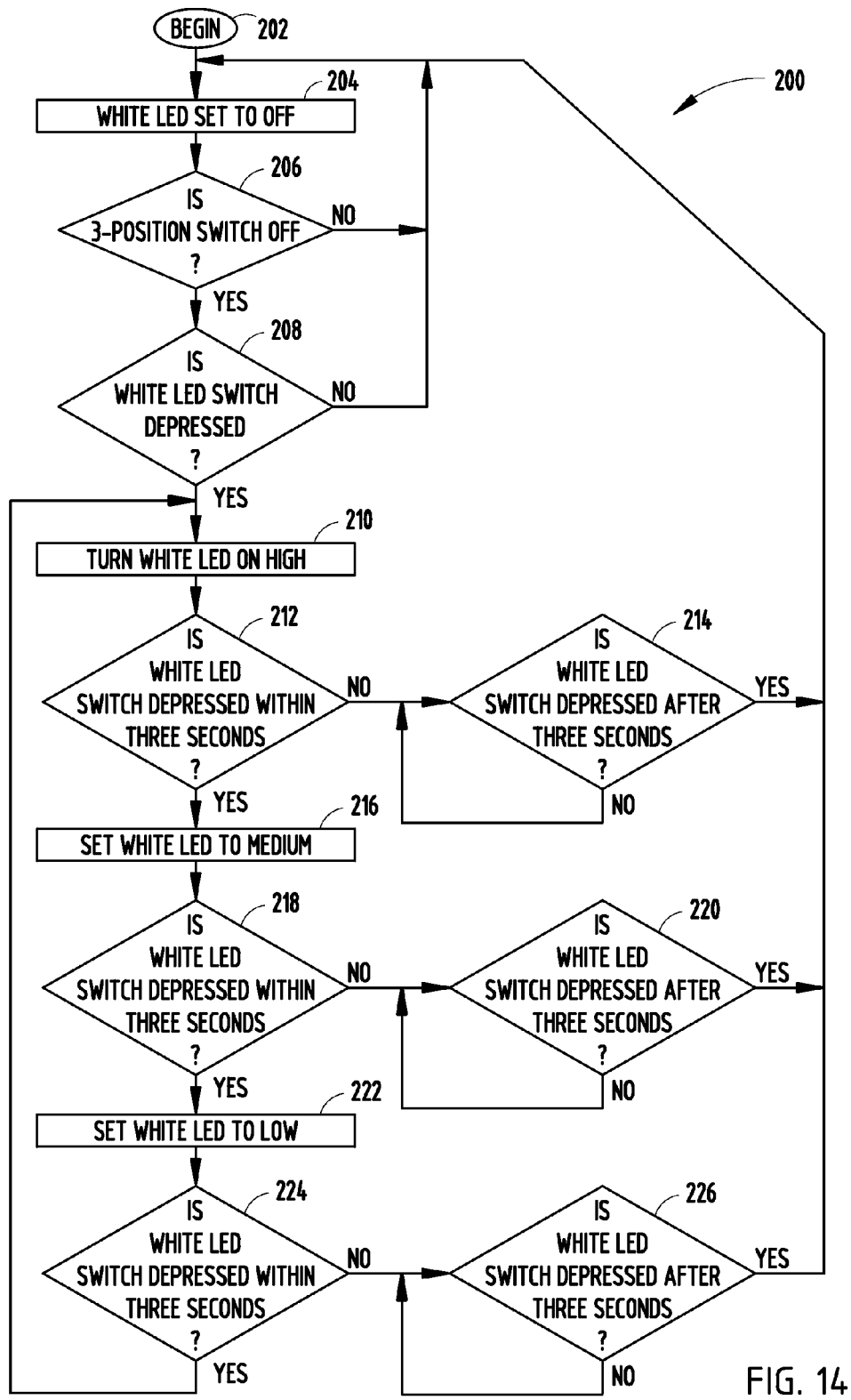
FIG. 14 is a flow diagram illustrating a routine for controlling the non-colored white LED, according to one embodiment.

Referring to FIG. 14, the white light control routine 200 is illustrated for controlling the operation of the visible white light source 14 to activate and deactivate the light source 14 and to further provide three available light intensities. Routine 200 begins at step 202 and proceeds to set the white LED to the off state. Next, in decision step 206, routine 200 determines if the three-position switch 22 is set to the off position and, if not, prevents activation of the visible white light source and returns to step 204. If the three-position switch is set to the off position, routine 200 proceeds to step 208 to determine if the white LED switch 24 is depressed and, if so, turns the white LED on at a high intensity level in step 210, preferably setting the white LED at the highest intensity level. Accordingly, the white LED, when turned on, is turned on at the highest intensity setting.

With the white LED set to the high intensity level, routine 200 proceeds to decision step 212 to determine if the white LED switch has been depressed within three seconds of turning the white LED on high and, if so, proceeds to step 216 to set the white LED to the next lowest intensity setting which, in one embodiment, is the medium intensity setting. If the white LED switch has not been depressed within the three second time period, routine 200 proceeds to decision step 214 to determine if the white LED switch is depressed after the three second time period and, if so, returns to step 204 to turn the white LED off. However, if the white LED switch is not depressed after three seconds, the white LED remains in the high intensity state.

With the white LED set to the medium intensity setting, routine 200 proceeds to step 218 to determine if the white LED switch is depressed within a three second time period of setting the white LED to the medium setting and, if so, sets the white LED to the next lowest intensity setting in step 222 which, in this embodiment, is the lowest intensity setting. If the white LED switch has not been depressed within the three second time period, routine 200 proceeds to step 220 to determine if the white LED switch is depressed after the three second time period and, if so, returns to step 204 to turn the white LED off. Otherwise, the white LED remains on at the medium intensity setting.

With the white LED set to the low intensity setting, routine 200 proceeds to step 224 to determine if the white LED switch has been depressed within a three second time period and, if so, returns to step 210 to turn the white LED on the high intensity setting. If the white LED switch has not been depressed within three seconds, routine 200 proceeds to step 226 to determine if the white LED switch has been depressed after three seconds and, if so, turns the white LED off in step 204. Otherwise, the white LED remains on at the low intensity setting.

Accordingly, the intensity of the white LED is selectively changed when the LED switch is depressed within three seconds for each switch depression to switch the white LED sequentially from high to medium to low intensity settings, and to repeat the sequence. It should be appreciated that the intensity of the white LED light source may be changed using pulse width modulation (PWM) light control, according to one embodiment. According to another embodiment, the intensity of the white LED may be controlled using pulsed frequency modulation (PFM).

Figure 15:
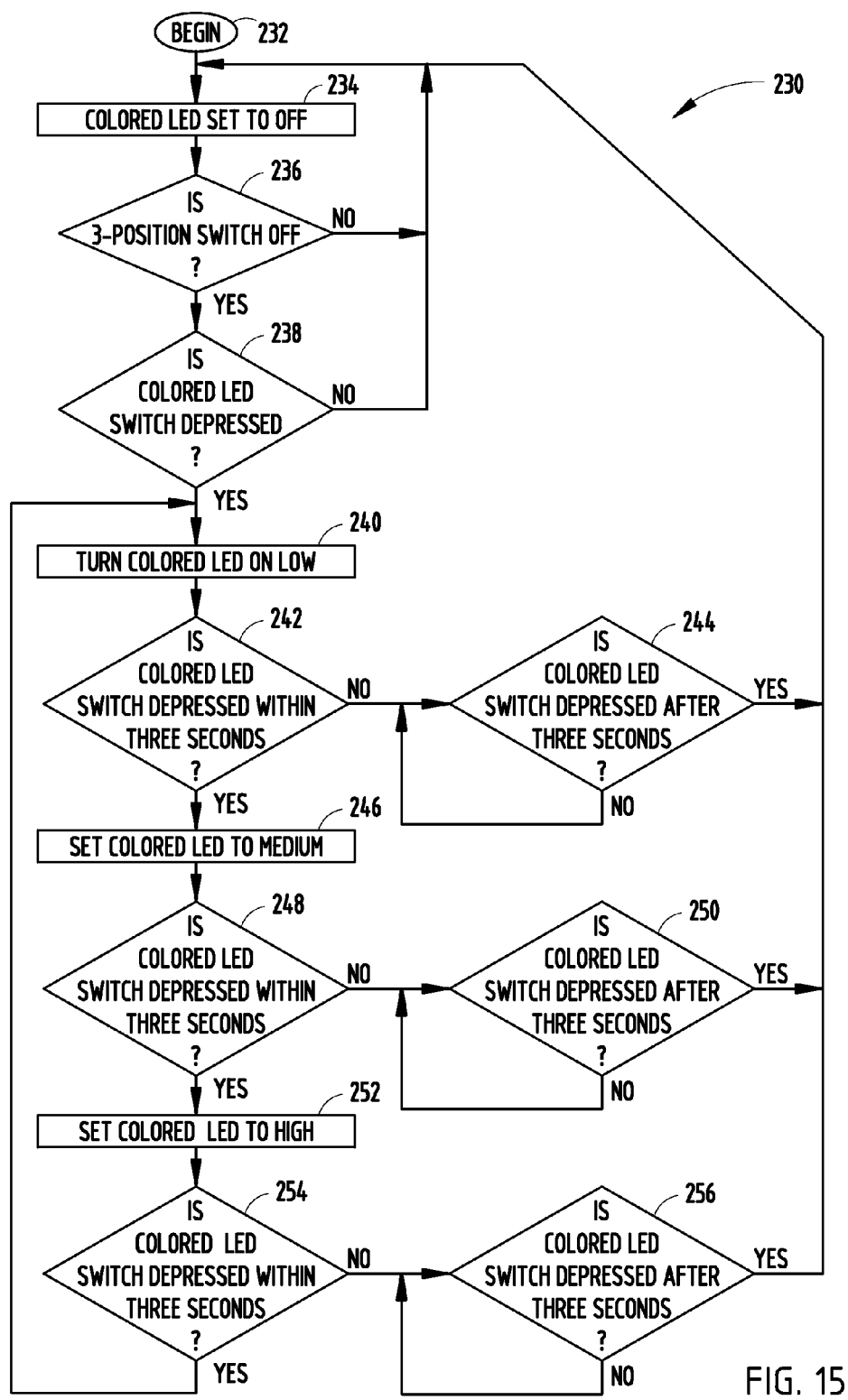
FIG. 15 is a flow diagram illustrating a control routine for controlling the colored LED, according to one embodiment.

Referring to FIG. 15, the colored light control routine 230 for controlling activation and further controlling intensity of the visible colored light source 14 is illustrated. Routine 230 begins at step 232 and proceeds to step 234 to set the colored LED to the off state. Next, in decision step 236, routine 230 determines if the three-position switch 22 is set to the off position and, if not, prevents activation of the visible colored light source and returns to step 234. If the three-position switch is set to the "off" position, routine 230 proceeds to step 238 to determine if the colored LED switch 24 is depressed and, if so, turns the colored LED on at a low intensity level in step 240, preferably setting the colored LED at the lowest intensity level. Accordingly, the colored LED, when turned on, is turned on to the lowest intensity setting. With the colored LED set to the low intensity level, routine 230 proceeds to decision step 242 to determine if the colored LED switch has been depressed within three seconds of turning the colored LED on low and, if so, proceeds to step 246 to set the colored LED to the next highest intensity setting, which in one embodiment is the medium intensity setting. If the colored LED switch has not been depressed within the three second time period, routine 230 proceeds to decision step 244 to determine if the colored LED switch is depressed after the three second time period and, if so, returns to step 234 to turn the colored LED off. However, if the colored LED switch is not depressed after three seconds, the colored LED remains on at the low intensity setting.

With the colored LED set to the medium intensity setting, routine 230 proceeds to step 248 to determine if the colored LED switch is depressed within a three second time period of setting the colored LED to the medium setting and, if so, proceeds to step 252 to set the colored LED to the next highest intensity setting, which in this embodiment is the highest intensity setting. If the colored LED switch has not been depressed within the three second time window, routine 230 proceeds to step 50 to determine if the colored LED switch is depressed after the three second time period and, if so, returns to step 234 to turn the colored LED off. Otherwise, the colored LED switch remains on at the medium intensity setting.

With the colored LED set to the high intensity setting, routine 230 proceeds to step 254 to determine if the colored LED switch has been depressed within a three second time period and, if so, returns to step 240 to adjust the colored LED setting to the low intensity setting. If the colored LED switch has not been depressed within three seconds, routine 200 proceeds to step 256 to determine if the colored LED switch has been depressed after three seconds and, if so, turns the colored LED off in step 234. Otherwise, the colored LED remains on at the high intensity setting.

Accordingly, the intensity of the colored LED may be selectively changed if the LED switch is depressed within three seconds for each switch depression to switch the colored LED sequentially from low to medium to high intensity settings and to repeat the sequence. It should be appreciated that the intensity of the colored LED light source may be changed using pulse width modulation (PWM) light control, according to one embodiment. According to another embodiment, the intensity of the colored LED may be controlled using pulsed frequency modulation (PFM).

The visible white light source 14 and colored light source 18 of lighting device 10 may be actuated and controlled in light intensity to provide desired intensity visible white and colored light beams. The lighting device 10 advantageously turns the visible white light source 14 on at a high intensity setting, whereas the colored light source 18 is turned on at a low intensity setting. This advantageously provides a user in the field with the ability to immediately realize bright white lighting from the white light source 14 on the one hand, whereas, on the other hand, the colored light may be used as a low profile light that turns on at low intensity and is less likely to be seen by an unwanted viewer in the field, particularly for a hunting application. While the light levels of intensity disclosed in the aforementioned embodiment include high, medium and low intensity settings, it should be appreciated that the visible white and colored light sources may be adjusted in different intensity levels, and may include a substantially continuous or ramped change in the level of light intensity, such as is discussed in the following embodiment.

Figure 16:
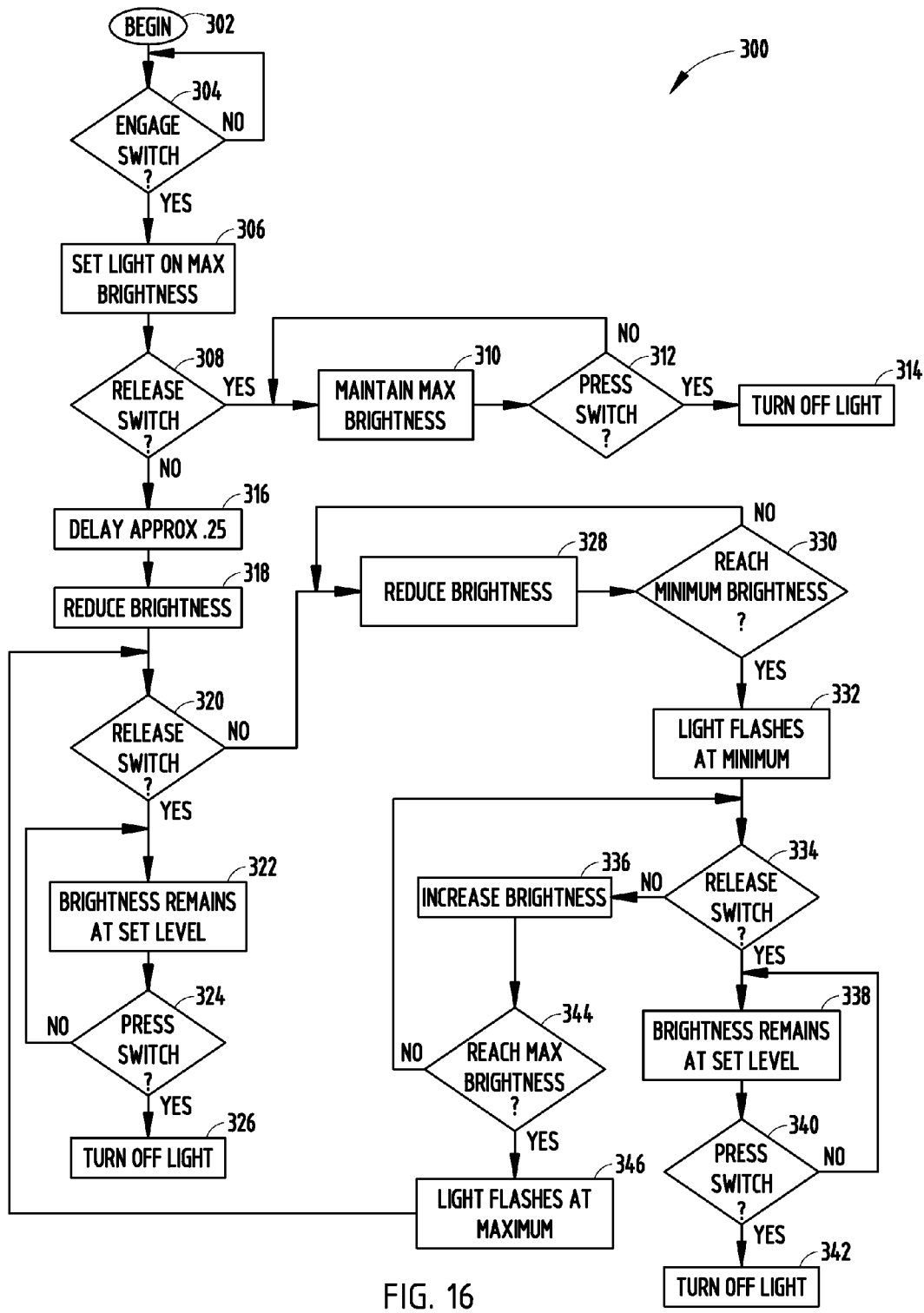
FIG. 16 is a flow diagram illustrating a routine for controlling light illumination intensity with the light control circuitry, according to one embodiment.

Referring to FIG. 16, a routine 300 is illustrated for providing user selectable light illumination intensity control of either one of the visible white light source 14 and colored light source 18. The light control routine 300 essentially processes the output signals of switches 24 and 26 and provides a controlled pulse width modulation signal to increase and decrease the intensity of the corresponding light beam generated by the corresponding light source. The pulse width modulation signal is supplied as an input to power the corresponding LED and has a duty cycle that is controlled to change the intensity of the light beam. To increase intensity of the light beam, the duty cycle of the pulse width modulated signal is increased, whereas to decrease intensity of the light beam the duty cycle of the pulse width modulation signal is decreased.

According to one embodiment, the microprocessor may employ an eight-bit PIC 16F616 having 256 output states to set the duty cycle of the pulse width modulated signal which, in this embodiment, allows the pulse width modulated signal to be adjusted incrementally in $\frac{1}{256}^{th}$ increments. At the maximum beam setting, the power supplied to the corresponding LED is continuous, with no duty cycle, whereas at the minimum light beam intensity, the duty cycle is set at about 12.5 percent, according to one example. When one of switches 24 and 26 is continuously depressed and the visible light is available, the duty cycle of the pulse width modulated signal supplied to the corresponding light source 14 or 18 is continuously increased and decreased to incrementally increase and decrease the light illumination intensity in a repeated ramp cycle, until the user no longer depresses the corresponding switch 24 or 26. Additionally, when the light source 14 or 18 approaches the maximum light intensity, the LED flashes and then begins to decrease in intensity and, when approaching the minimum light source, the LED flashes and then begins to increase in intensity. Thus, the light illumination intensity of the LED 14 or 18 cycles up and down repeatedly as the user continuously depresses and holds the corresponding switch 24 or 26 in the closed contact "on" position.

The light control routine 300, shown in FIG. 16 may be implemented as software executed by a controller, specifically the microprocessor. The light control routine 300 begins at step 302, proceeds to step 304 and, if the user selectable switch is engaged such that the electrical switch contact is closed, then proceeds to step 306 to set the light source on the maximum brightness. Next, method 300 proceeds to determine if the switch has been released such that the contact is open in decision step 308 and, if so, maintains the maximum brightness setting of the light source. Thereafter, in decision step 312, method 300 determines whether the switch has been pressed and, if so, turns the light source off in step 314. When the light source 14 or 18 is turned off, method 300 may enter a sleep mode in which no or very little power consumption is required by the control circuitry. If the switch 24 or 26 has not been pressed, the maximum brightness of the light source is maintained.

If the switch 24 or 26 has not been released as determined in step 308, method 300 proceeds to wait for a time delay of approximately 0.25 seconds in step 316, which provides a sufficient time to distinguish between an initial switch depression to turn the light on and off, and further desire to adjust brightness of the light source 14 or 18. Following the 0.25 second time delay, method 300 proceeds to decision step 320 to determine whether the switch has been released. If the switch is released, method 300 no longer reduces the brightness and maintains the brightness at the set level in step 322. With the brightness set at the set level, method 300 monitors the switch 24 or 26 to determine if the switch 24 or 26 has been depressed in decision step 324, and, if so, turns the light source 14 or 18 off in step 326. Otherwise, the brightness remains at the set level.

The light source 14 or 18 will continue to be incrementally decreased in brightness in step 318 with the switch continuously depressed, until a minimum brightness is reached. The reduction in brightness of the light source 14 or 18 may include an incremental decrease in brightness of the light source 14 or 18 by changing the duty cycle of the pulse width modulated signal, according to one embodiment. If decision step 320 determines that the switch 24 or 26 has been released, method 300 proceeds to step 328 to continue to reduce the brightness. In decision step 330, method 300 determines whether the minimum brightness has been reached, and, if not, continues to reduce the brightness of the light source 14 or 18. If the minimum brightness has been reached, method 300 proceeds to step 332 to cause the light source 14 or 18 to flash at the minimum brightness, thus providing the user with an indication that the minimum brightness level has been reached.

Once the minimum brightness has been reached and the light source 14 or 18 flashes at step 332, the light intensity begins to ramp up to increase the brightness as long as the corresponding switch 24 or 26 remains depressed. In decision step 334, method 300 will monitor whether the switch 24 or 26 has been released or not. If the switch 24 or 26 has not been released, the brightness continues to increase in step 336 until either the switch 24 or 26 is released or the maximum brightness level is reached. At decision step 344, routine 300 determines if the maximum brightness has been reached and, if not, returns to step 334 to determine if the switch 24 or 26 has been released. If the switch 24 or 26 is released, the brightness level remains at the set level in step 338. Thereafter, method 300 proceeds to monitor whether the switch 24 or 26 has been depressed in step 340, and, if so, turns the light source 14 or 18 off in step 342.

If the switch 24 or 26 has not been released and the brightness is increasing and in decision step 344 it is determined that the maximum brightness has been reached, then routine 300 flashes the light source 14 or 18 at the maximum brightness in step 346. It should be appreciated that the light source 14 or 18 is flashed at both maximum and minimum brightness levels to provide a user with an indication of reaching the extreme illumination intensity settings. The flash may be achieved by turning the light source 14 or 18 off and on one or more times. Following flash of the light source 14 or 18 in step 346, routine 300 returns to step 320 to determine if the corresponding switch 24 or 26 has been released and, if not, starts to repeat step 328 to reduce brightness of the light source 14 or 18. Accordingly, the light illumination intensity repeatedly cycles up and down when the switch 24 or 26 is continuously held in the closed contact position.

Accordingly, the light control routine 300 advantageously allows for a user to control the lighting device 10 by activating the corresponding switch 24 or 26 to turn the respective light source 14 or 18 on and off and to further adjust the intensity of the light illumination for both the visible white and colored light sources 14 and 18. By simply depressing the corresponding switches 24 or 26, the control circuitry is able to cyclically increase and decrease the light illumination intensity for the corresponding light source 14 or 18, respectively, thus offering the user the ability to select the desired intensity level of the light beam provided thereby.

The lighting device 10 employs an electrochemical cell battery 58 as the power source for supplying electrical power to the one or more light sources 14, 16, 18 and 20, in addition to powering the control circuitry. The lighting device 10 may be powered by one of a number of different types of electrochemical cell batteries. For example, a single AA-size alkaline electrochemical cell battery having an electrochemistry that includes an alkaline electrolyte and electrodes generally made up of zinc and manganese dioxide ($Zn/MnO_2$) as the active electrochemical materials, according to one embodiment may be employed. According to another embodiment, a lithium AA-size $LiFeS'_2$ electrochemical cell may be employed as the power source. According to a further embodiment, a nickel metal hydride (NiMH) electrochemical cell may be employed as the power source. Different types of batteries cells employing different chemical compositions provide different power capabilities. The lighting device 10 of the present invention advantageously determines the type of electrochemical cell battery 58 and provides optimal control to control the lighting device 10 based on the determined electrochemical cell composition. Specifically, the control circuitry may control the electrical power supplied to one or more lighting sources when a higher capacity battery chemistry composition of the power source is determined, and may provide a lesser power supplied to the one or more lighting sources when a lesser capacity battery chemistry composition of the power source is determined.

According to one embodiment, the control circuitry may provide enhanced operation of the lighting device 10 to achieve a desired minimum operating time for a given application. For example, given a requirement to provide a minimum of six hours of operation for a given lighting source, the lighting device 10 may control electrical power supplied to the corresponding light source to achieve the minimum operating time of six hours while providing an optimum or maximum light illumination during that six hour time period. For example, if an alkaline battery power source supplies enough power to achieve light illumination of nineteen lumens with a light source for six hours, whereas a lithium battery cell is capable of providing greater than nineteen lumens for six hours, then the power supplied to the lithium powered light source may be increased to a higher illumination setting to provide greater than nineteen lumens as long as the light operates for at least the minimum time period of six hours. In this case, the control circuitry will drive a lithium (Li) powered light source at a higher current to achieve greater light illumination, as compared to when an alkaline electrochemical cell is employed as the power source.

The battery power source 58 can have a variety of electrochemical compositions, wherein the electrochemical composition can be determined in order to control one or more of the lighting devices 14, 16, 18, 20, according to one embodiment.

Typically, each of the lighting devices 14, 16, 18 and 20 has a load that is in electrical communication with the power source, when switched on, such as the visible white LED 14 being in electrical communication with the battery power source 58. The processor 112 can determine the electrochemical composition of certain battery power sources, according to the disclosed embodiments.

Figure 17:
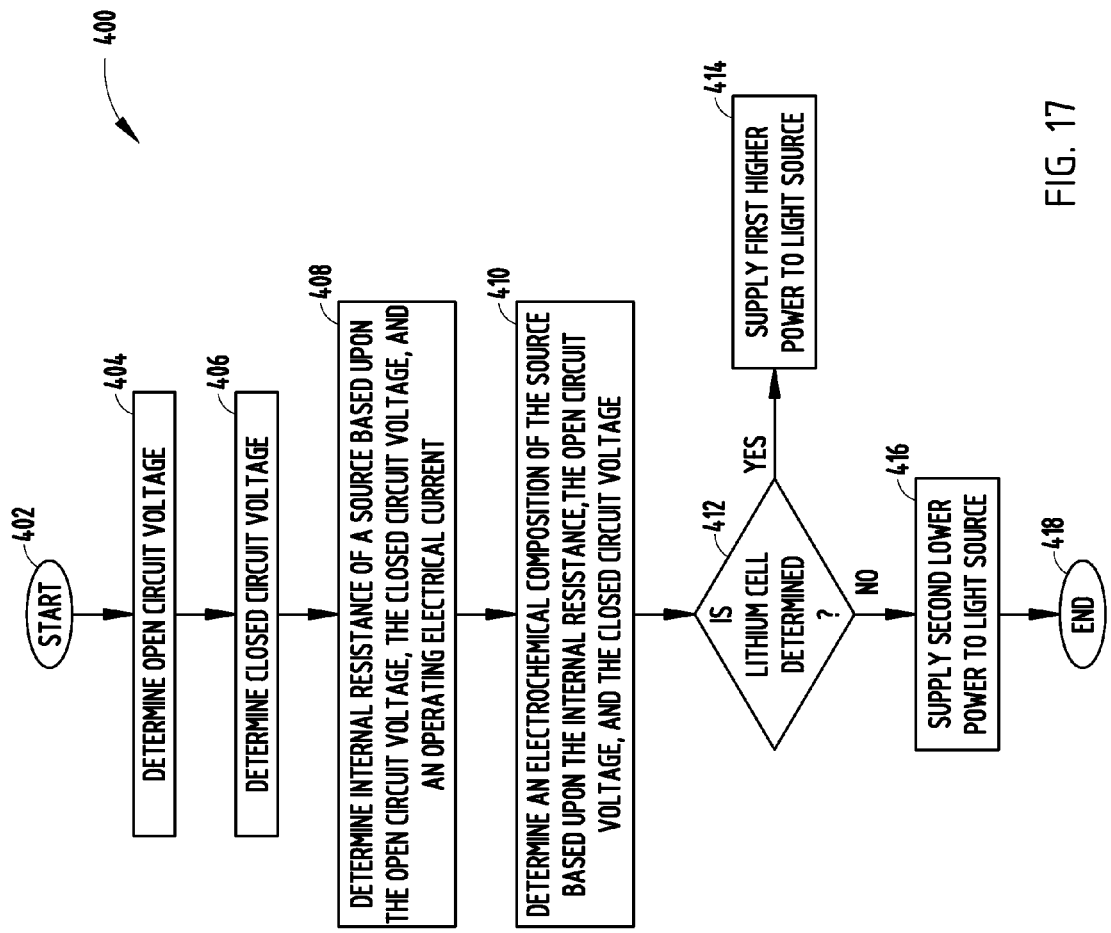
FIG. 17 is a flow diagram illustrating a routine for determining chemistry composition of a power source and controlling the lighting device based on the chemistry composition, according to one embodiment.

The processor 112 can determine the electrochemical composition of the battery power source 58 by executing software routine 400 shown in FIG. 17 and by receiving data to determine a voltage potential of the battery power source 58 under at least one operating condition of the lighting device 10 with respect to a load. The load may be a known load, such as a resistor or one of the light sources. According to one embodiment, the processor 112 can determine open circuit voltage, closed circuit voltage, and an electrical current supplied by the battery power source 58 to the load, and detect the electrochemical composition of the battery power source 58 based upon the determined voltage potential under the operating condition and the determined electrical current.

According to one embodiment, the processor 112 determines an open circuit voltage ($V_{oc}$) and a closed circuit voltage ($V_{cc}$) under known load conditions. The known load condition may include a test load resistance $R_{LOAD}$ having a known resistance value that has applied for a time period, such as 100 milliseconds, sufficient to acquire the open circuit voltage, closed circuit voltage and current, according to one embodiment. The open circuit voltage ($V_{oc}$) and the closed circuit voltage ($V_{cc}$) can be subtracted and divided by the determined electrical current provided to the load in order to determine the internal resistance ($R_{INTERNAL}$) of the battery power source 58, according to one embodiment. Based upon the internal resistance ($R_{INTERNAL}$) of the battery power source 58, the electrochemical composition of the battery power source 58 can then be determined. Thus, the internal resistance ($R_{INTERNAL}$) of the battery power source 58 can be represented by the following equation:

$$\frac{(V_{oc} - V_{cc})}{I} = R_{INTERNAL}$$

According to another embodiment, the processor 12 determines the internal resistance ($R_{INTERNAL}$) of the battery power source 58 based on the open circuit voltage, closed circuit voltage, and the known load resistance $R_{LOAD}$, as set forth in the following equation:

$$R_{INTERNAL} = \frac{(V_{oc} - V_{cc}) \times R_{LOAD}}{V_{cc}}$$

In this embodiment, the electrical current need not be determined by the processor. Instead, the internal resistance of the battery power source 58 is determined by the difference between the open circuit voltage and the closed circuit voltage multiplied by the known load resistance $R_{LOAD}$ divided by the closed circuit voltage $V_{cc}$. It should be appreciated that the above determinations of internal resistance generally apply to determining the internal resistance of a single cell battery. However, it should be appreciated that the internal resistance of multiple cells, such as two battery cells, may be determined. It should be appreciated that other suitable determinations for the internal resistance can be employed, according to other embodiments.

The processor 112 can then use the internal resistance ($R_{INTERNAL}$) the magnitude of the voltage (e.g., the open circuit voltage ($V_{oc}$) and the closed circuit voltage ($V_{cc}$), temperature data (e.g., data received from a temperature monitoring device, if available), stored hierarchical correction data, a lookup table of known internal resistance ($R_{INTERNAL}$) values for different electrochemical compositions, or a combination thereof, to determine the electrochemical composition of the battery power source 58. Correction data may include correction values, such as multiplier factors to compensate for parameters that may affect the determination of the internal resistance and determination of the chemistry composition. The lookup table may be predetermined, according to one embodiment, or may be dynamically adjusted and updated. Typically, the lookup table data is stored in a memory device. Additionally, the determined open circuit voltage ($V_{oc}$) can be used as a cross-reference with the internal resistance ($R_{INTERNAL}$) of the processor 112 to determine the electrochemical composition of the battery power source 58. The controller 112 can then control one or more operating parameters of one or more of the lighting devices 14, 16, 18 and 20 based upon the determined electrochemical composition of the battery power source 58.

By way of explanation and not limitation, the determined electrochemical composition of the battery power source 58 can be used to determine the state of charge of the battery power source 58, as described in greater detail herein. Additionally or alternatively, the determined electrochemical composition of the battery power source 58 can be used to alter the electrical current supplied to one or more of the lighting sources 14, 16, 18 and 20 in conjunction with the temperature data received by the processor 112 from the temperature monitoring device (if available). Thus, the heat emitted by the lighting sources 14, 16, 18 and 20 can be monitored by a temperature monitoring device, and the electrical current supplied to the lighting sources 14, 16, 18 and 20 can be controlled according to a desired lighting operating temperature with respect to the electrochemical composition of the battery power source 58.

According to one embodiment, the processor 112 determines the electrochemical composition of the battery power source 58 at time intervals, such as, but not limited to, detecting the electrochemical composition every five (5) minutes. By detecting the electrochemical composition of the battery power source 58 at predetermined time intervals, the power consumption of the processor 112 and processing load of the processor 112 for the electrochemical composition determination is limited when compared to continuously determining the electrochemical composition of the battery power source 58. Further, by determining the electrochemical composition of the battery power source 58 at predetermined time intervals, the processor 112 can confirm or correct the previous electrochemical composition determination and/or determine the electrochemical composition of the newly connected battery power source 58. While time intervals may be used to determine the electrochemical composition of the battery power source 58, it should be appreciated that other events may trigger the determination of battery cell chemistry including light activation or use, temperature, lumen output, switching of modes, and other events, according to other embodiments.

According to one embodiment, a method of determining the electrochemical composition of the battery power source 58 is generally shown in FIG. 17 at reference identifier 400. The method 400 starts at step 402, and proceeds to step 404, wherein an open circuit voltage is determined. At step 406, a closed circuit voltage is determined. Typically, the closed circuit voltage can be determined with respect to a known load. The method 400 then proceeds to step 408, wherein the internal resistance ($R_{INTERNAL}$) of the battery source 58 is determined based upon the open circuit voltage, the closed circuit voltage, and an operating electrical current. At step 410, the electrochemical composition of the battery power source 50 is determined based upon the internal resistance ($R_{INTERNAL}$) and the open and close circuit voltages.

Once the electrochemical composition of the battery power source 50 is determined, method 400 advantageously employs the determined electrochemical composition to control one or more light sources 14, 16, 18 and 20 of the lighting device 10. Proceeding to step 412, method 400 determines if the battery cell is a lithium battery cell according to the disclosed embodiment. If the battery cell is determined to be a lithium battery cell, method 400 proceeds to step 414 to supply a first higher power to one or more of the light sources so as to provide a higher lighting intensity from the actuated light source. Whereas, if the battery cell is determined not to be a lithium cell, method 400 proceeds to step 416 to supply a second lower power to the one or more lighting devices so as to operate the selected lighting device at a lower light intensity. In this example, the battery cell that is determined not to be a lithium cell may be assumed to be an alkaline battery cell or other cell generally having a more limited power capability as compared to a lithium battery.

While the method 400 of detecting a battery chemistry composition and controlling the lighting device controls the lighting device based on detection of either a lithium or a non-lithium battery cell according to one embodiment, it should be appreciated that the method 400 may further determine other types of electrochemical cell batteries including, but not limited to, carbon-zinc alkaline cells, lithium cells, lithium ion cells, and nickel metal hydroxide electrochemical cells, according to other embodiments. The routine 400 thereby ensures that the lighting device 10 is sufficiently operated at a light illumination that achieves the required minimum time period of operation with optimum light illumination. The method 400 may controls various features and operating characteristics of the lighting device 10, and may further provide an indication of the available electrical charge, based on the determined electrochemical composition, according to further embodiments.

According to one example, the white LED 14 may be controlled to achieve 6 hours of continuous operation by driving the white LED 14 at an electrical current of approximately 60 milliamps to achieve 20 lumens of light illumination when the power source is a single AA-size alkaline electrochemical cell battery. The white LED 14 may be controlled to be driven at a higher current of 120 milliamps to achieve 40 lumens of light illumination for 6 continuous hours when the power source is a single AA-size lithium battery cell. While an example of 6 hours of operation time is being described herein, it should be appreciated that the minimum required operating time may include any designated time period.

Additionally, the lighting device 10 may be controlled to provide a minimum amount of lesser illumination light sufficient to allow a user to change out the battery when the battery approaches depletion of sufficient stored energy and nears the end of its life. Specifically, it may be desirable to provide for a time period, such as half an hour, of reduced lighting intensity to ensure extended availability of at least some lighting while providing sufficient time for the user to change out the battery. If a fuel gauge device is employed, the fuel gauge may warn the user of the need to change the battery, and the lighting device 10 may be controlled based upon the determined chemistry detection to optimize availability of the light source for a minimum required time period.

Figure 21:
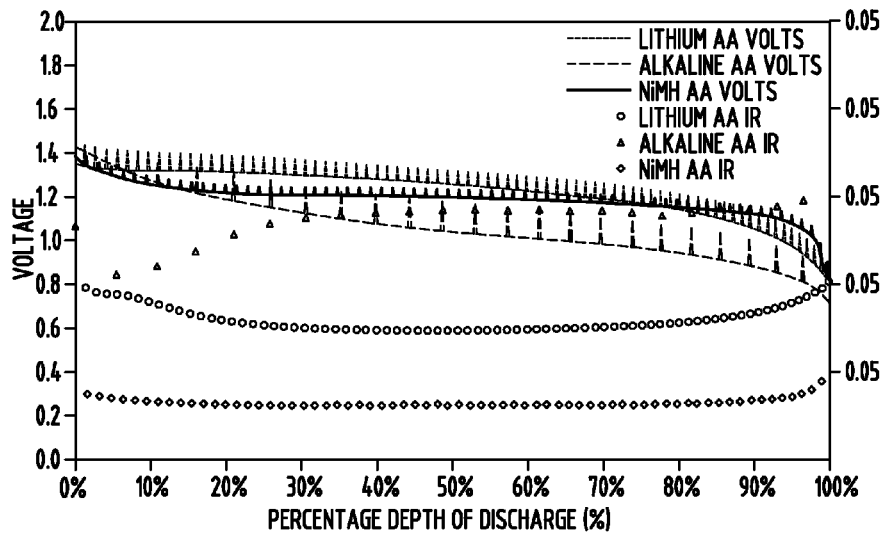
FIG. 21 is a chart illustrating one example of a state of charge with respect to a voltage potential and an internal resistance of a battery cell with different electrochemical compositions.

As illustrated in FIG. 21, the percentage depth of discharge, voltage potential, and the internal resistance ($R_{INTERNAL}$) of a power source differs based upon the electrochemistry composition of the power source. Typically, the voltage potential of the power source changes based upon the percentage depth of discharge at one rate of change, and the internal resistance ($R_{INTERNAL}$) of the power source alters based upon the percentage of discharge at a second rate of change. Thus, by comparing the voltage potential and the internal resistance ($R_{INTERNAL}$) when the electrochemistry composition of the power source is determined, the percent depth of discharge can then be determined.

Figure 22:
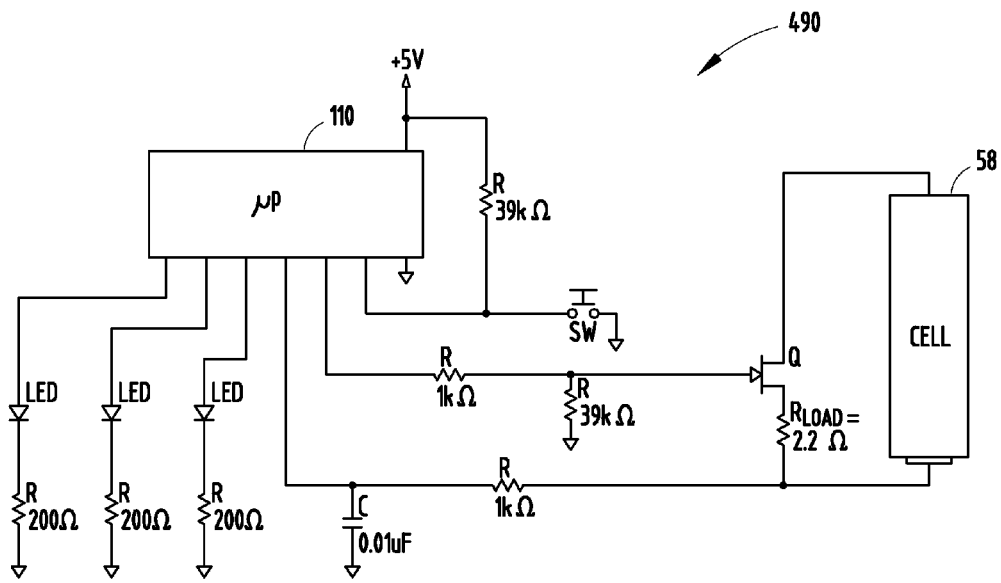
FIG. 22 is a circuit diagram generally illustrating test circuitry for detecting the chemistry composition of a battery cell, according to one embodiment.

Referring to FIG. 22, electrochemistry composition test circuitry 490 is illustrating for detecting chemistry composition of a battery cell 58, according to one embodiment. It should be appreciated that the test circuitry 490 may be built into the lighting device and may be included as part of the control circuitry. Alternately, the test circuitry 490 may be a separate circuit. Test circuitry 490 employs the microprocessor 110 powered by a voltage supply of five volts (+5 v), according to one example. It should be appreciated that a voltage boost circuit may be employed to boost a voltage of the battery cell 58 to five volts to power the microprocessor 110. The test circuitry includes a known load resistance $R_{LOAD}$ connectable via a switch, shown as an FET transistor Q, in parallel with the battery cell 58. According to one embodiment, the load resistance $R_{LOAD}$ has a known value of 2.2 ohms. Connected in series with the load resistance $R_{LOAD}$ is the transistor Q for switching the load resistance $R_{LOAD}$ in or out of a closed circuit with the battery cell 58. Switch Q may be implemented as an FET transistor controlled by an output of the microprocessor 110. Transistor Q may be controlled by the microprocessor 110 to apply the load resistance $R_{LOAD}$ across the battery cell 58 to allow for measurement of the closed circuit voltage and current, and may be opened to allow for measurement of the open circuit voltage of the battery cell 58. Voltage measurements may be taken from the positive (+) terminal of battery cell 58 by an RC circuit coupled to the microprocessor 110.

It should be appreciated that according to the illustrated test circuit 490, a switch SW may be depressed to initiate the chemistry composition test, according to one embodiment. However, it should be appreciated that the test circuitry 490 may be implemented automatically by the microprocessor 110 based on time intervals, or other triggering events such as activating one or more light sources or changing (replacing) one or more batteries. Further, three LEDs are shown connected to the microprocessor 110, The three LEDs may include light sources of the lighting device, or may include additional lighting indicators that may be used to indicate the determined type of battery cell chemistry composition. For example, a first LED may be employed to indicate detection of a lithium battery cell, a second LED may be employed to indicate detection of a metal hydride battery cell, and a third LED may be used to indicate detection of an alkaline battery cell.

Figure 23:
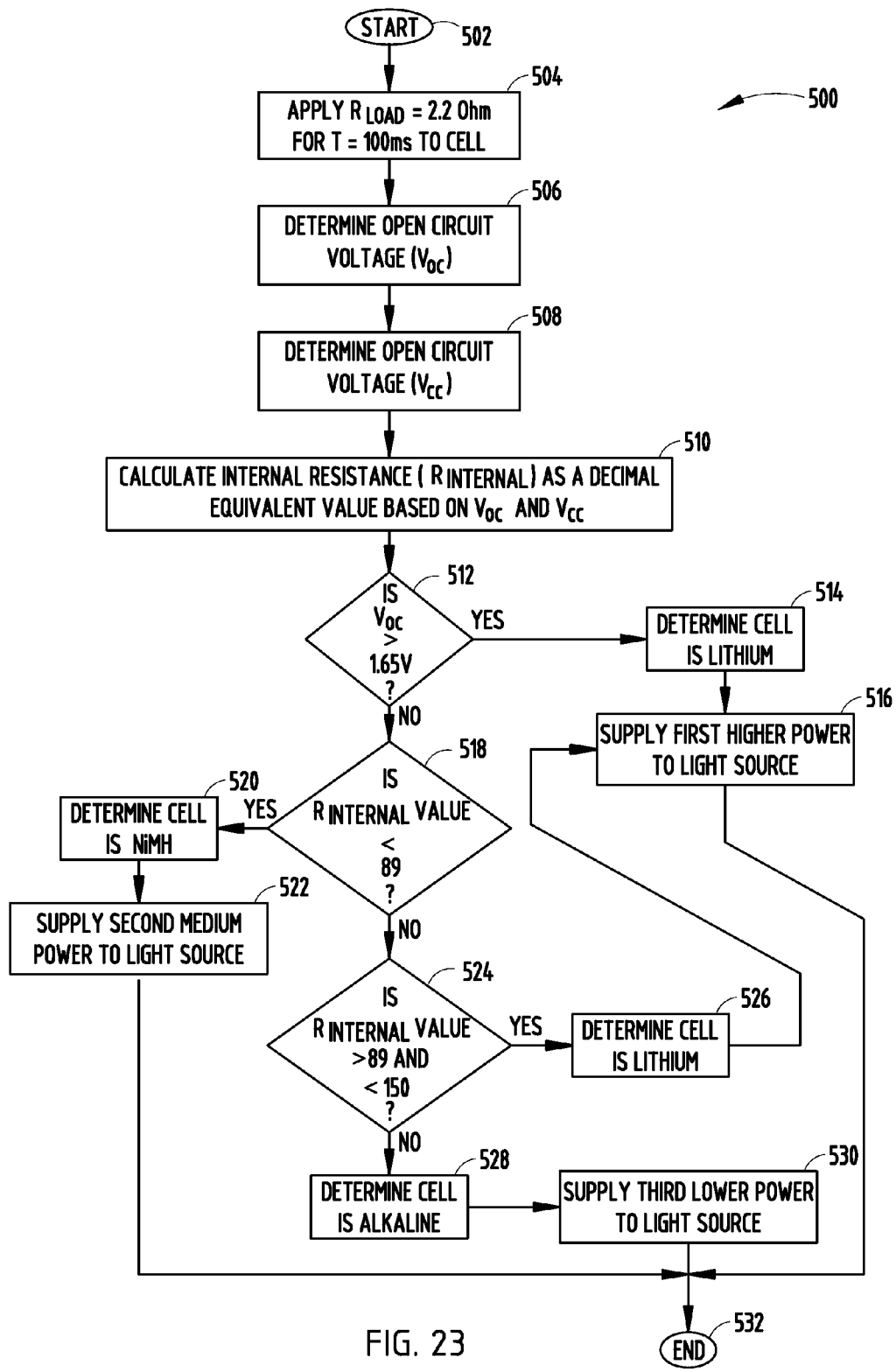
FIG. 23 is a flow diagram illustrating a routine for determining chemistry composition of a power source and controlling the lighting device based on the chemistry composition, according to another embodiment.

Referring to FIG. 23, a method of determining the electrochemical composition of a battery power source 58 is generally illustrated at reference identifier 500, according to another embodiment. The method 500 starts at step 502, and proceeds to step 504 to apply a known load resistance $R_{LOAD}$ of about 2.2 ohms, according to one example, to the battery cell 58 for a test time period of about 100 milliseconds, according to one example. During the chemistry detection test, method 500 determines an open circuit voltage $V_{oc}$ in step 506 and a closed circuit voltage $V_{cc}$ in step 508. The open circuit voltage $V_{oc}$ is determined with the load not applied to the battery cell such that the battery circuit is open-circuited and no current flows in or out of the battery cell, whereas the closed circuit voltage $V_{oc}$ is determined when the known load resistance $R_{LOAD}$ is applied across the battery cell terminals such that current flows across load resistance $R_{LOAD}$. The method 500 then proceeds to step 510, wherein the internal resistance ($R_{INTERNAL}$) of the battery cell 58 is determined based upon the open circuit voltage $V_{oc}$ and closed circuit voltage V. According to one embodiment, current may also be used to determine the internal resistance of the battery cell. The internal resistance value is determined as a decimal equivalent value, according to the disclosed embodiment, which is determined based on a multiplication factor, such as $\frac{1}{1000}^{th}$ of the actual resistance. It should be appreciated that the internal resistance may be determined as an actual ohmic value, according to another embodiment.

The battery chemistry detection method 500 then proceeds to decision step 512 to compare the open circuit voltage $V_{oc}$ to a voltage threshold of about 1.65 volts, according to one embodiment. If the open circuit voltage $V_{oc}$ is greater than the voltage threshold of 1.65 volts, method 500 determines that the battery cell is a lithium cell in step 514, and proceeds to supply a first higher power to a light source, when activated, in step 516 since the lithium battery cell in the given example has the highest battery capacity.

If the open circuit voltage $V_{oc}$ is not greater than 1.65 volts, method 500 proceeds to decision step 512 to determine if the internal resistance value is less than a low first value of 89. If the internal resistance value is less than the value of 89, method 500 determines that the battery cell is a nickel metal hydride (NiMH) in step 520. When the battery cell is determined to be a nickel metal hydride cell, method 500 supplies a second medium power to a light source, when activated, in step 522. Accordingly, a nickel metal hydride battery in this example is considered a medium power battery and the power supplied to the light source(s) is controlled to provide a medium power supply that is less than the high power supply and greater than a low power supply.

If the internal resistance $R_{INTERNAL}$ value is equal to or greater than the low first value of 89, method 500 proceeds to decision step 524 to determine if the internal resistance $R_{INTERNAL}$ value is in a range between the low first value of 89 and a high second value of 150. If the internal resistance value is between low value of 89 and high value of 150, method 500 determines that the battery cell is a lithium cell in step 526, and then proceeds to supply the first higher power to the light source, when activated, in step 516. It should be appreciated that the battery cell may be determined to be a lithium battery cell which has a voltage less than or equal to 1.65 volts and has an internal resistance value between low value 89 and high value 150 when the lithium battery cell has been partially discharged, as opposed to a fully charged lithium battery cell.

If the internal resistance $R_{INTERNAL}$ value is greater than or equal to the second high value 150 in decision step 524, method 500 proceeds to step 528 to determine that the cell is an alkaline battery cell. When the cell is determined to be an alkaline battery cell, method 500 supplies a third lower power to a light source, when activated, in step 530. Accordingly, a high internal resistance value is used to determine that an alkaline battery cell is present such that a light source may be adjusted to receive only a lower power so that the light source may be operated sufficiently long in duration. Once the light source has been supplied power at the appropriate power level according to the determined battery cell composition, routine 500 ends at step 532. It should be appreciated, that method 500 may be repeated at select intervals or based on any of the number of triggering events, such as replacement of the batteries, actuation of a light source, and other events.

Figure 24:
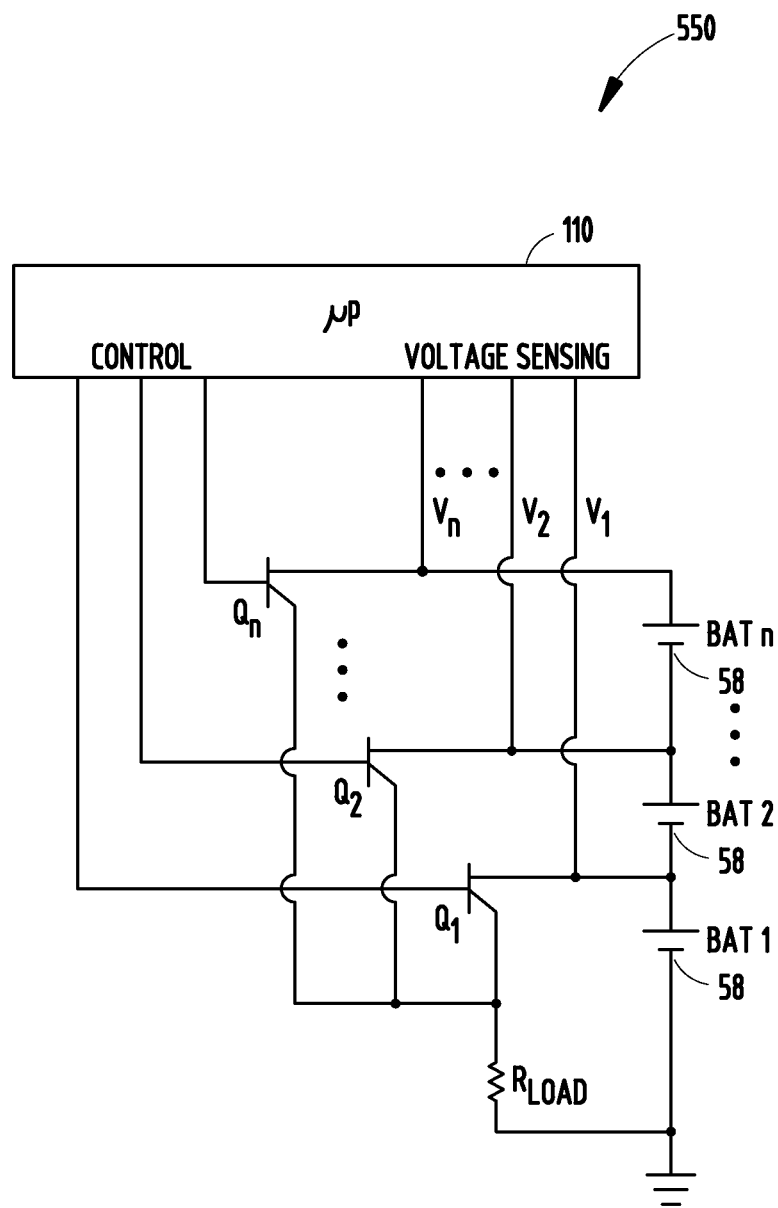
FIG. 24 is a circuit diagram generally illustrating test circuitry for detecting the chemistry composition of multiple battery cells, according to another embodiment.

It should further be appreciated that the internal resistance value and chemistry composition of multiple cells employed in the lighting device 10 may be determined, according to further embodiments. In one embodiment, multiple battery cells connected in series may be tested to determine the internal resistance $R_{INTERNAL}$ of each battery cell and the electrochemical composition of each battery cell, as shown by the circuit 550 in FIG. 24. In this embodiment, a plurality of battery cells 58, labeled BAT 1-BAT n are shown connected in series, such that the positive terminal of one battery electrically contacts the negative terminal of an adjoining connected battery. Each battery cell 58 generates a voltage potential and, in a series connection, the voltage potentials are summed together. The chemistry detection circuit 550 is shown including the microprocessor 110 having a plurality of voltage sensing lines for sensing voltages $V_1$-$V_n$ which measure the voltage potential at the positive terminals of each of the plurality of batteries BAT 1-BAT n, respectively. The sensed voltage of BAT 1 is voltage $V_1$, the sensed voltage of BAT 2 is the difference between voltages $V_2$ and $V_1$, etc.

The battery chemistry detection circuit 550 includes three switches, shown as FET transistors $Q_1$-$Q_n$, each having a control line for receiving a control signal from microprocessor 110. Transistor $Q_1$ switches the known load resistance $R_{LOAD}$ into a closed circuit connection with the first battery BAT 1 in response to a control signal from the microprocessor 110. Transistor $Q_2$ switches the load resistance $R_{LOAD}$ into a closed circuit connection with batteries BAT 1 and BAT 2. Transistor $Q_n$ switches the load resistance $R_{LOAD}$ into connection with batteries BAT 1-BAT n.

When transistor $Q_1$ is closed, the load resistance $R_{LOAD}$ is applied across the first battery BAT 1, such that current flows through the first battery and the load resistance $R_{LOAD}$. During a test procedure, the open circuit voltage for voltage potential $V_1$ is measured when the load resistance $R_{LOAD}$ is not applied across the battery BAT 1, and the closed circuit voltage $V_{CC}$ is measured while the load resistance $R_{LOAD}$ is applied across battery BAT 1. When transistor $Q_2$ is closed, the open and closed circuit voltages of the voltage potentials $V_1$ and $V_2$ are measured during the test procedure. Similarly, when transistor $Q_n$ is closed, the open and closed circuit voltages of voltage potentials $V_1$-$V_n$ are measured during the test procedure.

It should be appreciated that the open circuit voltage of the first battery BAT 1 is determined by sensing voltage $V_1$, whereas the open circuit voltage of the second battery BAT 2 is determined by subtracting the voltage $V_1$ from voltage $V_2$, and the open circuit voltage of BAT n is determined by subtracting voltage $V_{n-1}$ from voltage $V_n$. The closed circuit voltages are also similarly measured. The internal resistance of each battery may be determined according to the following equations:

$$R_{INTERNAL1} = \frac{V_{oc1} - V_{cc1}}{V_{cc1}} \cdot R_{LOAD}; \text{ and}$$

$$R_{INTERNAL1} + R_{INTERNAL2} = \frac{V_{oc2+1} - V_{cc2+1}}{V_{cc2+1}} \cdot R_{LOAD}.$$

$V_{oc1}$ represents the open circuit voltage of battery BAT 1, and $V_{cc1}$ represents the closed circuit voltage of battery BAT 1. $V_{oc2}$ represents the open circuit voltage of battery BAT 2, and $V_{cc2}$ represents the closed circuit voltage of battery BAT 2. The internal resistance $R_{INTERNAL1}$ is the internal resistance of the first battery BAT 1. The internal resistance $R_{INTERNAL2}$ is the internal resistance of the second battery BAT 2. It should be appreciated that the internal resistance of further batteries up to BAT n may likewise be determined.

It should further be appreciated that the battery chemistry detection circuit 550 may detect different types of batteries, such as alkaline, nickel metal hydride and lithium battery cells used in various combinations. While one example of a battery chemistry detection circuit 550 has been illustrated for detecting chemistry of a plurality of battery cells in a series connection, it should be appreciated that other configurations of circuit 550 may be employed to detect other arrangements of batteries, such as a plurality of batteries connected in parallel and/or series, in various battery cell numbers and combinations.

Referring to FIGS. 18 and 19, a three-position toggle switch 22' is illustrated according to a second embodiment of the present invention. The three-position switch 22' shown in the second embodiment employs a toggle switch that is required to be pushed and rotated into one of three contact positions. By requiring double action of pushing and sliding/rotation, the switch 22' allows for controlled operation between the side light mode, IR mode and visible light modes while preventing accidental unintended movement of the switch 22' to an unintended position. This advantageously allows for the lighting device 10 to be activated in the side light or IR modes which are typically desirable in stealth conditions and prevents accidental activation of a visible light source due to accidental or unintended activation of the switch 22'.

As seen in FIGS. 18 and 19, the three-position switch 22' includes a toggle switch box 36A having a pin 36C extending therefrom and assembly 36B. In addition, switch 22 includes bracket 36D, and a rotating arm 36E having an opening for receiving pin 36C and having prongs 36G for engaging a tooth 36H in the off position or for engaging channels 36I or 36J in the side light or IR switch positions.

As seen in FIGS. 20A-20D, the three-position switch 22 is actuatable by a user to achieve a desired lighting operation. In the off position of switch 22', arm 36E has prongs 36G engaged with tooth 364 of bracket 36F when pin 36C of the toggle switch 22' is in the central position as shown in FIG. 20A. In order to actuate switch 22' to the side light position, actuator member 37 is depressed as shown in FIG. 20B which pushes bracket 36F and its tooth 36H away from and out of engagement with prongs 36G of arms 36E. With the actuation member 37 depressed, the switch 22' may be slid or rotated to the side light position as shown in FIG. 20C and actuation member 37 may then be released as shown in FIG. 20D such that the bracket 36F returns to trap the prongs 36G of arm 36E into the locked position in the side light mode. In this position, toggle pin 36 may not be easily rotated as it requires first a push and then a rotation movement. To place switch 22' in the IR mode, the actuator member 37 is depressed and rotated in the opposite direction to lock the prongs 36G into engagement with the other slot of bracket 36F. The three-position switch 22' thereby provides for user controlled reliable switching between the various lighting modes while inhibiting accidental switching to unintended lighting modes.

It should be appreciated that the lighting device 10 may be useful in various applications. For example, the light body 12 may be connected to a mount assembly that enables the lighting device 10 to be employed on an article of clothing, such as a headband, a baseball cap or visor, or anywhere else.

While the invention has been described in detail herein in accordance with certain preferred embodiments thereof, many modifications and changes therein may be affected by those skilled in the art without departing from the spirit of the invention. Accordingly, it is our intent to be limited only by the scope of the appending claims and not by way of the details and instrumentalities describing the embodiments shown herein.

What is claimed is:

1. A lighting device having adjustable intensity control, said lighting device comprising:
   a housing;
   a first light source;
   a second light source;
   a first switch actuatable to activate the first light source;
   a second switch comprising a three position toggle switch actuatable to a first position to allow activation of the first light source, actuatable to a second position to prevent activation of the first light source and to activate the second light source, and actuatable to a third position to prevent activation of the first and second light sources, wherein the second switch is configured to prevent simultaneous activation of the first light source and the second light source; and
   control circuitry to control activation and adjustment of intensity of the first light source to generate a light beam in response to actuation of the first switch, wherein the control circuitry cyclically switches among a plurality of intensity levels to adjust intensity of the light beam based on user actuation of the first switch.

2. The lighting device of claim 1, wherein the control circuitry adjusts intensity of the light beam when the first switch is actuated within a predetermined time period.

3. The lighting device of claim 1, wherein the control circuitry adjusts intensity of the light beam when the first switch is continuously actuated.

4. The lighting device of claim 3, wherein the control circuitry incrementally increases and decreases the light illumination intensity when the first switch is continuously actuated.

5. The lighting device of claim 1, wherein the control circuitry provides a pulse width modulated signal to the light source and adjusts a duty cycle of pulse width modulated signal to adjust intensity of the first light source.

6. The lighting device of claim 1, wherein the control circuitry provides a pulsed frequency modulation signal to control intensity of the first light source.

7. The lighting device of claim 1, wherein the first light source comprises a white light emitting LED.

8. The lighting device of claim 1, wherein the second light source emits ultraviolet light.

9. The lighting device of claim 8, wherein the control circuitry controls adjustment of intensity of the second light source in response to actuation of the second switch.

10. The lighting device of claim 1, further comprising a power source having one battery to provide power to the first light source and the second light source.

11. The lighting device as defined in claim 1, wherein the first switch comprises a push-button switch.

12. The lighting device as defined in claim 1, wherein the control circuitry comprises a boost circuit.

13. The lighting device of claim 1, further comprising a third light source and a third switch to control activation of the third light source.

14. The lighting device as defined in claim 2, wherein the control circuitry prohibits further adjustment of the intensity of the light beam when the first switch is actuated beyond the predetermined time period following a prior actuation.

15. The lighting device as defined in claim 14, wherein the predetermined time period comprises approximately three seconds.

16. A lighting device having adjustable intensity control, said lighting device comprising:
a housing;
a first light source for generating a light beam; a second light source;
a battery compartment provided in the housing and adapted to hold one or more batteries for providing power to the light source;
a first switch for activating the first light source;
a second switch comprising a three position toggle switch actuatable to a first position to allow activation of the first light source, actuatable to a second position to prevent activation of the first light source and to activate the second light source, and actuatable to a third position to prevent activation of the first and second light sources, wherein the second switch is configured to prevent simultaneous activation of the first light source and the second light source; and
control circuitry for controlling activation and adjustment of intensity of the light beam in response to actuation of the switch, wherein the control circuitry cyclically switches among a plurality of intensity levels to adjust intensity of the light beam based on actuation of the first switch, wherein the control circuitry adjusts intensity of the light beam when the first switch is actuated within a predetermined time period following a prior actuation, and wherein the control circuitry prohibits further adjustment of intensity of the light beam when the first switch is actuated beyond the predetermined time period.

17. The lighting device as defined in claim 16, wherein the predetermined time period comprises approximately three seconds.

18. The lighting device as defined in claim 16, wherein the control circuitry adjusts intensity of the light beam when the switch is continuously actuated.

* * * * *